United States Patent
Maycotte et al.

(10) Patent No.: US 10,373,209 B2
(45) Date of Patent: Aug. 6, 2019

(54) DRIVING BEHAVIORS, OPINIONS, AND PERSPECTIVES BASED ON CONSUMER DATA

(71) Applicant: Umbel Corporation, Austin, TX (US)

(72) Inventors: Higinio O. Maycotte, Austin, TX (US); Michael Baird, Austin, TX (US); Rishi Shah, Austin, TX (US); Travis Turner, Austin, TX (US); Troy Lanier, Austin, TX (US)

(73) Assignee: U-MVPINDEX LLC, Austin, TX (US)

( * ) Notice: Subject to any disclaimer, the term of this patent is extended or adjusted under 35 U.S.C. 154(b) by 93 days.

(21) Appl. No.: 14/448,672

(22) Filed: Jul. 31, 2014

(65) Prior Publication Data
US 2016/0034966 A1    Feb. 4, 2016

(51) Int. Cl.
*G06Q 30/02*    (2012.01)

(52) U.S. Cl.
CPC ..... *G06Q 30/0269* (2013.01); *G06Q 30/0201* (2013.01); *G06Q 30/0242* (2013.01)

(58) Field of Classification Search
CPC ................................................ G06C 30/0201
USPC ....................................................... 705/7.29
See application file for complete search history.

(56) References Cited

U.S. PATENT DOCUMENTS

| | | | |
|---|---|---|---|
| 5,724,521 A | 3/1998 | Dedrick | |
| 5,848,396 A | 12/1998 | Gerace | |
| 6,134,532 A | 10/2000 | Lazarus et al. | |
| 6,286,005 B1 | 9/2001 | Cannon | |
| 6,470,079 B1 | 10/2002 | Benson | |
| 6,654,725 B1 | 11/2003 | Langheinrich et al. | |
| 6,772,129 B2 | 8/2004 | Alvarez et al. | |
| 7,103,592 B2 | 9/2006 | Huret | |
| 7,197,459 B1 | 3/2007 | Harinarayan et al. | |
| 7,254,547 B1 | 8/2007 | Beck et al. | |
| 7,356,547 B2 | 4/2008 | Ozer et al. | |
| 7,383,243 B2 | 6/2008 | Conkwright et al. | |

(Continued)

OTHER PUBLICATIONS

A Comprehensive Guide to Retargeting, Retargeter, https://retargeter.com/wp-content/uploads/2014/03/A_Comprehensive_Guide_To_Retargeting.pdf. (Year: 2014).*

(Continued)

*Primary Examiner* — Jeff Zimmerman
(74) *Attorney, Agent, or Firm* — Toler Law Group, PC

(57) ABSTRACT

A method includes receiving an input identifying a target audience segment (e.g., reflecting a behavior, perspective, or opinion an advertiser would like to influence/increase). The method further includes identifying a first attribute measured by a measurement system, where the first attribute is determined to correlate to users tracked by the measurement system and that belong to the target audience segment, which reflects the behavior that the advertiser wants to influence/increase. The method further includes identifying a second attribute that corresponds to the first attribute, where a messaging action directed to the first attribute, the second attribute, or a combination thereof is available at one or more digital networks. The digital networks may require payment for message delivery or may allow such messaging for free. The method further includes initiating the messaging action aimed at driving behavior directed to the first attribute, the second attribute, or a combination thereof.

18 Claims, 12 Drawing Sheets

(56) References Cited

U.S. PATENT DOCUMENTS

| | | | |
|---|---|---|---|
| 7,424,439 B1 | 9/2008 | Fayyad et al. | |
| 7,519,562 B1 | 4/2009 | Vander Mey et al. | |
| 7,523,087 B1* | 4/2009 | Agarwal | G06Q 30/02 705/7.29 |
| 7,689,456 B2 | 3/2010 | Schroeder et al. | |
| 7,729,940 B2* | 6/2010 | Harvey et al. | 705/7.31 |
| 7,835,940 B2 | 11/2010 | Kowalchuk | |
| 7,958,000 B2 | 6/2011 | Luby | |
| 8,000,993 B2* | 8/2011 | Harvey et al. | 705/7.29 |
| 8,060,398 B2* | 11/2011 | Canning et al. | 705/7.29 |
| 8,112,301 B2* | 2/2012 | Harvey et al. | 705/7.29 |
| 8,464,290 B2* | 6/2013 | Beyda | G06Q 30/02 705/14.49 |
| 8,620,748 B1* | 12/2013 | Ruarte | G06Q 30/02 705/14.41 |
| 8,634,814 B2* | 1/2014 | Root | H04M 3/42348 455/414.3 |
| 8,762,201 B1* | 6/2014 | Noonan | G06Q 30/0242 705/14.41 |
| 9,117,227 B1* | 8/2015 | Agrawal | G06Q 30/0242 |
| 2002/0144262 A1* | 10/2002 | Plotnick | G11B 27/005 725/32 |
| 2003/0154212 A1* | 8/2003 | Schirmer | G06Q 10/107 |
| 2005/0093866 A1* | 5/2005 | Ebert | G06Q 10/06 345/440 |
| 2005/0125289 A1* | 6/2005 | Beyda | G06Q 30/02 705/14.53 |
| 2006/0041480 A1* | 2/2006 | Briggs | G06Q 30/02 705/14.41 |
| 2006/0047725 A1 | 3/2006 | Bramson | |
| 2006/0116930 A1 | 6/2006 | Goldstein | |
| 2007/0100805 A1* | 5/2007 | Ramer | G06F 16/951 |
| 2007/0124290 A1* | 5/2007 | Swanson | G06Q 30/02 |
| 2007/0208728 A1* | 9/2007 | Zhang | G06F 16/337 |
| 2007/0214097 A1 | 9/2007 | Parsons et al. | |
| 2007/0260635 A1* | 11/2007 | Ramer | G06Q 30/0247 |
| 2008/0091508 A1* | 4/2008 | Rane | G06Q 30/02 705/7.33 |
| 2008/0103898 A1* | 5/2008 | Flake | G06Q 30/02 705/14.41 |
| 2008/0109491 A1 | 5/2008 | Gupta | |
| 2008/0140508 A1* | 6/2008 | Anand | G06Q 30/02 705/14.43 |
| 2008/0288310 A1* | 11/2008 | Aaltonen | G06Q 10/06375 705/14.42 |
| 2009/0106070 A1* | 4/2009 | Konar | G06Q 30/02 705/14.41 |
| 2009/0150224 A1* | 6/2009 | Lu | G06Q 30/02 705/7.29 |
| 2009/0150919 A1* | 6/2009 | Lee | H04N 7/17309 725/10 |
| 2009/0248513 A1* | 10/2009 | Aggarwal | G06Q 30/02 705/14.72 |
| 2009/0259518 A1* | 10/2009 | Harvey | G06Q 10/0639 705/7.29 |
| 2009/0307073 A1 | 12/2009 | MirrokniBanadaki et al. | |
| 2010/0011059 A1 | 1/2010 | Han et al. | |
| 2010/0023408 A1* | 1/2010 | McNeill | G06Q 30/02 705/14.69 |
| 2010/0042421 A1* | 2/2010 | Bai | G06Q 30/02 705/14.71 |
| 2010/0049584 A1* | 2/2010 | Mehta | G06Q 30/02 705/14.45 |
| 2010/0145791 A1* | 6/2010 | Canning et al. | 705/14.41 |
| 2010/0146531 A1* | 6/2010 | Fu | G06Q 30/0201 725/14 |
| 2010/0161492 A1* | 6/2010 | Harvey | G06Q 10/0639 705/50 |
| 2010/0169175 A1* | 7/2010 | Koran | G06Q 10/087 705/14.45 |
| 2010/0169792 A1* | 7/2010 | Ascar | G06F 11/3414 715/744 |
| 2010/0306043 A1* | 12/2010 | Lindsay | G06Q 30/02 705/14.41 |
| 2011/0106611 A1* | 5/2011 | Chang | G06Q 30/02 705/14.42 |
| 2011/0110515 A1* | 5/2011 | Tidwell | H04N 21/23109 380/200 |
| 2011/0125573 A1* | 5/2011 | Yonezaki | G06Q 30/02 705/14.48 |
| 2011/0208586 A1* | 8/2011 | Joa | G06Q 30/0201 705/14.53 |
| 2011/0225038 A1* | 9/2011 | Fontoura | G06Q 30/02 705/14.49 |
| 2011/0288907 A1* | 11/2011 | Harvey | G06Q 10/0639 705/7.29 |
| 2012/0022937 A1* | 1/2012 | Bhatia | G06O 30/0241 705/14.41 |
| 2012/0041792 A1* | 2/2012 | Priyadarshan | G06Q 30/0251 705/5 |
| 2012/0041817 A1* | 2/2012 | Priyadarshan | G06Q 30/0244 705/14.43 |
| 2012/0041969 A1* | 2/2012 | Priyadarshan | G06Q 30/02 707/769 |
| 2012/0042253 A1* | 2/2012 | Priyadarshan | G06Q 30/02 715/733 |
| 2012/0042262 A1* | 2/2012 | Priyadarshan | G06Q 30/0269 715/745 |
| 2012/0047022 A1* | 2/2012 | Shamim | G06Q 30/0269 705/14.66 |
| 2012/0054020 A1* | 3/2012 | Jacobs | G06Q 30/0243 705/14.42 |
| 2012/0079519 A1* | 3/2012 | Fu et al. | 725/14 |
| 2012/0089455 A1* | 4/2012 | Belani | G06Q 30/0245 705/14.44 |
| 2012/0203594 A1* | 8/2012 | Groer | G06Q 10/10 705/7.29 |
| 2012/0215903 A1* | 8/2012 | Fleischman | G06Q 30/0201 709/224 |
| 2012/0245978 A1 | 9/2012 | Jain et al. | |
| 2012/0323674 A1* | 12/2012 | Simmons | G06Q 30/02 705/14.41 |
| 2013/0006706 A1* | 1/2013 | Harvey et al. | 705/7.29 |
| 2013/0084882 A1* | 4/2013 | Khorashadi | H04L 67/22 455/456.1 |
| 2013/0151332 A1* | 6/2013 | Yan | G06Q 30/0243 705/14.42 |
| 2013/0166648 A1* | 6/2013 | Allard | G06Q 30/0242 709/204 |
| 2013/0204710 A1* | 8/2013 | Boland | G06Q 30/0241 705/14.66 |
| 2013/0227394 A1* | 8/2013 | Sazhin | G06F 17/24 715/234 |
| 2013/0268351 A1* | 10/2013 | Abraham | G06Q 30/0246 705/14.45 |
| 2013/0297543 A1* | 11/2013 | Treiser | G06Q 30/02 706/45 |
| 2013/0305271 A1* | 11/2013 | Kamen | H04N 5/44543 725/13 |
| 2014/0012659 A1* | 1/2014 | Yan | G06Q 30/0241 705/14.42 |
| 2014/0033317 A1* | 1/2014 | Barber | G06Q 30/0242 726/26 |
| 2014/0040171 A1* | 2/2014 | Segalov | G06Q 30/02 706/12 |
| 2014/0046777 A1* | 2/2014 | Markey | G06Q 30/0269 705/14.66 |
| 2014/0114745 A1* | 4/2014 | Bruich | G06Q 30/0242 705/14.44 |
| 2014/0120864 A1* | 5/2014 | Manolarakis | H04W 24/08 455/405 |
| 2014/0143018 A1* | 5/2014 | Nies | G06Q 30/016 705/7.32 |
| 2014/0173641 A1* | 6/2014 | Bhatia | H04N 21/252 725/9 |
| 2014/0173643 A1* | 6/2014 | Bhatia et al. | 725/13 |
| 2014/0189541 A1* | 7/2014 | Chen | H04W 4/21 715/753 |

(56) References Cited

U.S. PATENT DOCUMENTS

| | | | | |
|---|---|---|---|---|
| 2014/0236715 | A1* | 8/2014 | Aronowich | G06Q 30/0254 705/14.52 |
| 2014/0278921 | A1* | 9/2014 | Sankaran | G06Q 30/0243 705/14.44 |
| 2014/0278959 | A1* | 9/2014 | Nukala | G06Q 30/0243 705/14.49 |
| 2015/0019639 | A1* | 1/2015 | Marlow | H04W 4/21 709/204 |
| 2015/0025948 | A1* | 1/2015 | Sankaran | G06Q 30/0242 705/14.4 |
| 2015/0046256 | A1* | 2/2015 | Beyda | G06O 30/02 705/14.49 |
| 2015/0149267 | A1* | 5/2015 | Thakker | G06Q 30/0207 705/14.16 |
| 2015/0161670 | A1* | 6/2015 | Shen | G06Q 30/0269 705/14.66 |
| 2015/0235261 | A1* | 8/2015 | Shulman | G06Q 30/0241 705/14.45 |

OTHER PUBLICATIONS

"Conversations= Brand Impact", Retrieved from << http://www.buzzlogic.com>>, Retrieved on Jan. 10, 2011, 2 pages.

"Maximize Your Audience with Reach Extension", Retrieved on Jul. 30, 2014, © 2014 Umbel Corp., Retrieved from <<https://www.umbel.com/go/reachextension/?utm_medium=email&utm_campaign=Reach%20Extension%20Blast%20-%20Contacts%20-%2082013&utm_content=Reach%20Extension%20Blast%20-%20Contacts%20-%2082013+CID_85aa55ca7085259>>, 6 pages.

"The Umbel Platform, Your customers deserve the best. Are you prepared to give it to them?", Retrieved from <<https://www.umbel.com/product/#reach-extension>>, Retrieved on Jul. 31, 2014, © 2014 Umbel Corp., 9 pages.

Agathou, A., "Looking Forward: The Future of Product Testing", Retrieved from <<http://www.thenextweb.com/socialmedia/2011/01/04/looking-forward-the-future-of-product-testing/>>, Jan. 4, 2011, 3 pages.

Ingram, M., "What If You Were Paid Based on Your Klout Score?", Retrieved from <<http://gigaom.com/2010/12/10/what-if-you-were-paid-based-on-your-klout-score/>>, Dec. 10, 2010, 11 pages.

Shah, R., "What is Reach Extension? Advertising at Scale", Retrieved from <<https://www.umbel.com/blog/advertising/reach-extension-scale/>>, Apr. 8, 2014, Umbel Corp., 4 pages.

Shankman, P., "Thoughts on Klout and Psychology", Huff Post Business, Retrieved from <<http://www.huffingtonpost.com/peter-shankman/thoughts-on-klout-and-psy_b_773300.html>>, Oct. 25, 2010, 4 pages.

"Reach Extension leverages Umbel's Digital Genome", Vimeo Video, Located at <<http://vimeo.com/72919888>>, Aug. 22, 2013, Vimeo, LLC, 2 pages.

Bass, F. M. et al., "Testing distributed lag models of advertising effect", Aug. 1972, vol. 9, No. 3, Journal of Marketing Research, pp. 298-308.

Gerber, A. et al., "How Large and Long-lasting Are the Persuasive Effects of Televised Campaign Ads? Results from a Randomized Field Experiment", American Political Science Review, vol. 105, No. 1 Feb. 2011, 16 pages.

Havlena, W.J. et al., "Decay effects in on line advertising: quantifying the impact of time since last exposure on branding effectiveness", Journal of Advertising Research, vol. 44, Dec. 2004, pp. 327-332.

* cited by examiner

DRIVING BEHAVIORS, OPINIONS, AND PERSPECTIVES BASED ON CONSUMER DATA

Influencing the behavior, opinions, or perspectives of an individual may be difficult. Media producers around the world may spend hundreds of billions of dollars every year to influence people in certain ways. For example, media producers may desire to encourage people to consume more of a specific product. Other media producers may want to affect political leanings or people's opinions on a topic (e.g., politics, environmentalism, etc.). As the examples described above demonstrate, a goal of certain kinds of communication may be to drive a particular kind of response. For centuries, the primary method of enticing people to take a certain action was through print media. Then, the method shifted to radio advertising. Now, there is a brand new digital medium that offers more promise than previous mediums. The internet and various associated digital media may have influence in influencing the actions of individual users, and may enable media producers to communicate with many people nearly instantly. Despite the strength of this new medium, if the media producers deliver messages to "incorrect" audiences, the messages may reduce the likelihood that those audiences will take a desired response (e.g., make a purchase, form a particular opinion, etc.).

SUMMARY

As internet usage increases, a larger volume of data regarding the interactions of individual users may become available. However, such data may be difficult to access and analyze, which may present a significant hurdle to harnessing the data and developing an understanding of an audience. Advertisers and other enterprises that are able to effectively use such data to understand their audience may have a greater chance to influence the opinions and behaviors of their audience. The present disclosure presents systems and methods of driving and influencing actions, behaviors, opinions, and/or perspectives based on consumer data. For example, a reach extension module may receive an identification of a target audience segment. The target audience segment may correspond to a segment of a population that an advertiser wishes to reach with precise messaging. The messaging could be delivered via an advertisement, an e-mail communication, or via another digital communication. As an illustrative, non-limiting example, if an advertiser is selling tickets to a football game, the target audience segment may be "audience members that are likely to buy tickets to football games." Examples of actions that an advertiser may wish to drive/increase/influence may include, but are not limited to, purchasing tickets, watching videos, purchasing retail items, navigating to a particular website, voting on a particular issue or for a particular candidate, etc. The reach extension module may identify first attributes associated with members of the target audience segment. For example, the reach extension module may identify first attributes "male" and "age 21-50" in response to determining that previous buyers of football tickets were largely male and between the ages of 21-50. The reach extension module may further identify second attributes that are correlated to the first attributes. For example, the reach extension module may identify a second attribute "likes beverage A" in response to determining that, in a population for which data is available, a large percentage of the men between the ages of 21-50 have an affinity for beverage A. The first attributes and/or the second attributes may be "available" attributes for which targeted communication is available. As an illustrative, non-limiting example, targeted communication could include an e-mail, an advertising message delivered via a social network, or a push notification on a mobile device. Alternatively, or in addition, the reach extension module may map the first attributes and/or the second attribute to additional available attributes. For example, one or more advertising networks may offer advertising targeted to users with an attribute "man" and/or an attribute "likes beverage A website." The reach extension module may map the first attribute "male" to the available attribute "man" and may map the second attribute "likes beverage A" to the available attribute "likes beverage A website."

Prior to initiating targeted communication aimed at driving behavior, the reach extension module may determine estimated cost and reach of one or more of the available attributes. "Reach" may be estimated as a number of unique views for an advertisement, a number of people who interact with the advertisement, a number of people who take a desired action as a result of the advertisement, a number of people expected to open an e-mail, number of people that have installed a mobile application, number of people wearing a device connected to the internet, or any combination thereof. For example, the reach extension module may query one or more channels for prices associated with the one or more available attributes. The prices may be represented as a cost per thousand impressions, a cost per click, a cost per e-mail, or a cost per notification. The type of pricing may depend on the network the targeted messaging is delivered on. The reach extension module may compare the received price information to historical data regarding previous targeted communication and audiences to estimate cost and reach. Based on the estimated cost and reach of the one or more available attributes, the reach extension module may reference a library of strategies and execute targeted communication at the one or more networks according to the strategy. The reach extension module may monitor results of the strategies, the number of people completing the desired behavior (e.g., reach of targeted communication, conversions due to targeted communication, cost of communication, etc.), adjust the strategies according to the results, and store data regarding the strategies for subsequent use. The described system and method may thus provide an automatic method to target communication aimed at driving behaviors. The targeted communication may exist on paid advertising networks, e-mail delivery systems, or other ways to digitally intercept a user's attention and promote a particular action.

DETAILED DESCRIPTION

Figure 1:
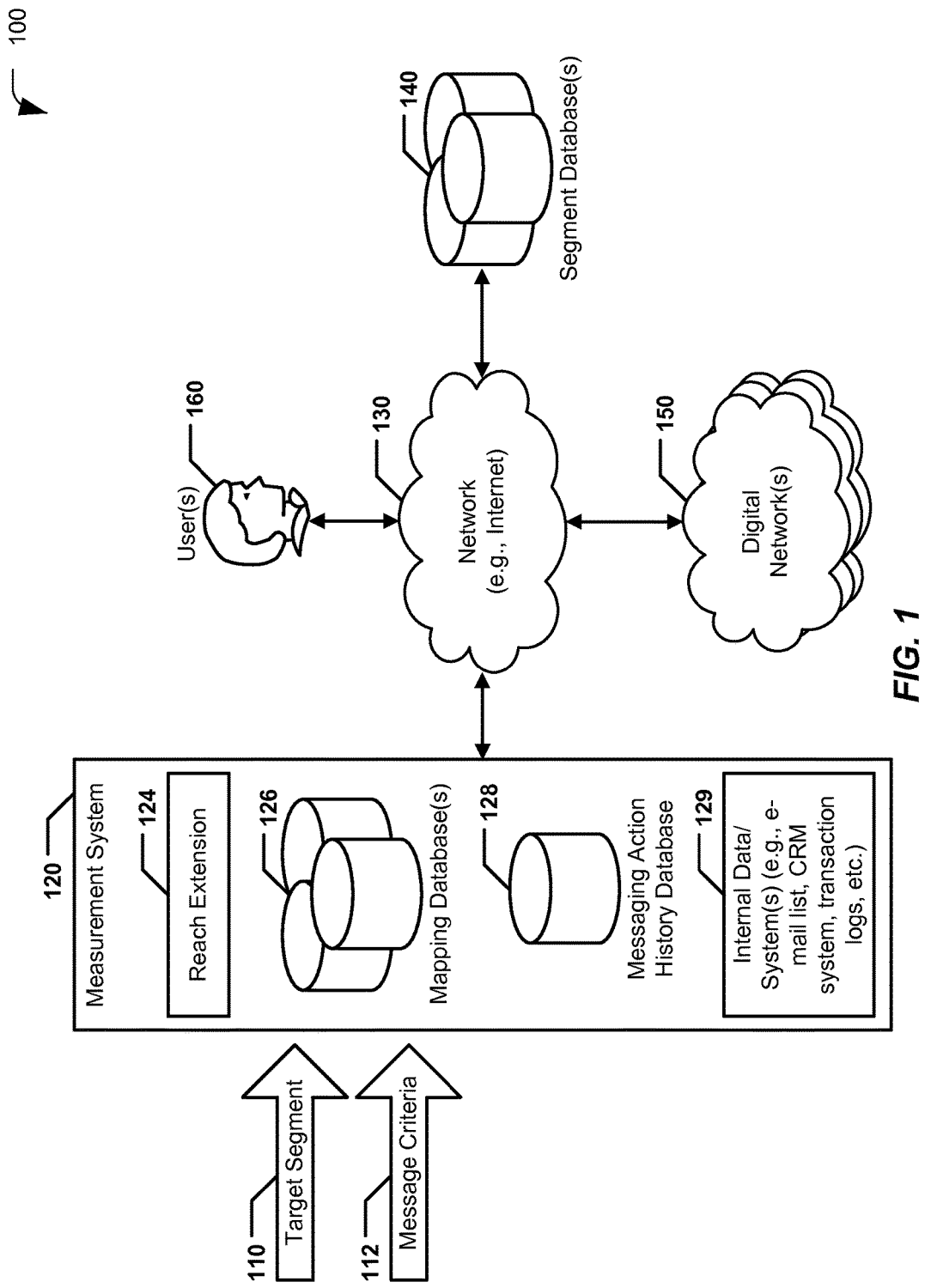
FIG. 1 is a diagram to illustrate a particular embodiment of a system that is operable to initiate a messaging action based on audience attributes.

FIG. 1 illustrates a particular embodiment of a system 100 that is operable to initiate a messaging action (e.g., an advertisement, an e-mail, a text message, a push notification to a computing device, a social networking message, etc.) based on audience attributes. The system 100 includes a measurement system 120 that may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks (LANs) and/or wide area networks (WANs), such as the Internet. In the illustrated example, the measurement system 120 is communicably coupled to a network 130.

The measurement system 120 may include a reach extension module 124, which may be implemented using instructions executable by one or more processors at the measurement system 120. In alternative embodiments, the reach extension module 124 may be external to and in communication with the measurement system 120 (e.g., functions described herein with reference to the reach extension module 124 may be executed on a separate computing device in communication with the measurement system 120). The reach extension module 124 is executable to initiate messaging actions based on audience attributes, as further described herein. For example, a media producer may initiate a messaging action in an attempt to cause an individual to perform a desired action (e.g., buy a product, form a particular opinion, join a cause, enroll in a program, watch a video, read an article, etc.) The reach extension module 124 may initiate messaging actions based on attributes of an audience made of people who have performed the desired action.

In a particular non-limiting example, initiating a messaging action corresponds to purchasing targeted advertising. In other non-limiting examples, initiating a messaging action corresponds to a different type of communication. In the context of targeted internet advertising, "purchasing" targeted advertising directed to a particular attribute refers to placing a bid with an advertising network (e.g., a social network that advertises to users, a search engine that inserts advertisements in search results webpages, etc.) for the opportunity to advertise to members/users of the advertising network that exhibit the particular attribute. Bids may be placed in terms of cost per mille (CPM), cost per click (CPC), or cost per action (CPA), as illustrative non-limiting examples. For example, an advertiser may place a CPC bid of $1.25 targeting unmarried users of a social network. If the advertiser's bid is accepted, the advertiser's advertisement(s) are presented to unmarried users of the social network and the advertiser is charged $1.25 each time a user of the social network clicks on the advertisement(s).

The measurement system 120 may be coupled via the network 130 to one or more segment databases 140 that store data (e.g., consumer data). Although the segment databases 140 are illustrated in FIG. 1 as being external to the measurement system 120, in alternative embodiments the segment databases 140 may be part of (e.g., internal to) the measurement system 120. As used herein, a "segment" is based on (or corresponds to) a group of people (e.g., an audience or a subset thereof). As further described herein, a set of traits may be determined for each segment. In an illustrative embodiment, the set of traits for a segment corresponds to a Digital Genome® of the segment (Digital Genome is a registered trademark of Umbel Corporation of Austin, Tex.). Examples of segments include, but are not limited to, brand affinity segments (also called brand segments), demographic segments, geographic segments, social activity segments, employer segments, educational institution segments, professional group segments, industry category of employer segments, brand affinity category segments, professional skills segments, job title segments, and behavioral segments. In a particular embodiment, behavioral segments are defined by a client (e.g., property owner or publisher) or by the measurement system 120, and represent actions taken on a client's property, such as "watched a video," "read an article," "made a purchase," etc. In this context, "property" refers to a media property, such as media content, a website, etc.

Additional examples of segments include segments based on an advertisement, an advertisement campaign, an advertisement placement, an advertisement context, a content item, a content context, content placement, etc. As another example, a segment may be generated based on a platform (e.g., desktop/laptop computer vs. mobile phone vs. tablet computer). For example, a "tablet segment" may include users that viewed a media property using a tablet computing device. Segments may be used to evaluate characteristics of an audience, craft a content strategy, generate advertising leads, create advertising pitches, and respond to inbound advertising requests.

The measurement system 120 collects and analyzes data that describes attributes of audiences of one or more media properties and stores the data and analysis results in the segment databases 140. In a particular embodiment, audience data is stored in the segment databases 140 according to media property (e.g., website), and audience segments are generated and analyzed on demand by the measurement system 120. Each segment is defined by a relation between members of a media property's audience (e.g., users) and one or more attributes. The relations may include a HAS relation, an AND relation, an OR relation, a NOT relation, or a combination thereof. For example, a "male" segment may be defined by a relation "users who have the male attribute" (male={users: has male attribute}), and a "males who watch video" segment may be defined by a relation "users who have the male attribute and have the watch video attribute" (male AND watches video={users: has male attribute; and has watches video attribute}). Similarly, a "males who do not watch video" segment may be defined by a relation "users who have the male attribute and do not have the watches video attribute" (male AND ¬watches video={users: has male attribute; and does not have watches video attribute}). In addition, a "male or watches video" segment may be defined by a relation "users who have the male attribute or users that have the watches video attribute" (male OR watches video={users: has male attribute; or has watches video attribute}). In a particular embodiment, the measurement system 120 collects and organizes data regarding audience members (e.g., users) of various media properties based on event signals received from user devices (e.g., mobile phones, tablet computers, laptop/desktop computers, radio-frequency identification (RFID) tags, etc.), media property web servers, network logs, and/or third-party signal sources, as further described with reference to FIGS. 8-9.

An audience of a media property may be segmented by demographic attributes, brand affinities, behavioral attributes, or a combination thereof. For example, as explained above, the "Male" segment may include all members of an audience of a media property who are male. As another example, a "Brand X" audience segment may include all members of the audience who are determined (e.g., based on statements made in social networks, actions performed on the media property, etc.) to have an affinity for "Brand X." As a third example, an audience segment may include all members of the audience who have performed a particular action related to the media property (e.g., users who have purchased an item at a website, watched a video, clicked on an advertisement, etc.). Further, audience segments may be defined by an AND or an OR relation between attributes (and associated segments). For example, a particular audience segment may include all members of an audience who are female AND who are between the ages of 23 and 27. As another example, a particular audience segment may include all members of an audience who are female OR who are between the ages of 23 and 27. In addition, audience segments may be defined in part by a NOT relation. For example, a segment may include all members of an audience who are NOT female.

The measurement system 120 may be in communication with one or more digital networks 150 (e.g., advertising networks, social networks, etc.) via the network 130. In alternative embodiments, the measurement system 120 may communicate with the digital networks 150 via a second network (e.g., a local area network (LAN), a wide area network (WAN) such as the Internet, etc.). The digital networks 150, or at least a subset thereof, may correspond to Internet-based networks and may offer the ability to purchase advertising targeted to specific users 160 and/or specific user attributes. For example, a social network may enable media producers (e.g., advertisers, political campaigns, etc.) to initiate messaging actions (e.g., advertisements, e-mails, text messages, push notifications, social network messages, etc.) targeted to users of the social network who have certain attributes (e.g., affinities, demographic attributes, etc.) using an auction-based system, as further described herein. The users 160 of the digital networks 150 may include users of the media properties (e.g., websites) for which data is collected by the measurement system 120, although this is not necessary. For example, one of the digital networks 150 may correspond to a social network. The social network may include a user "John Smith," who is also a registered user of a particular blog that is tracked by the measurement system 120. Thus, in this example, John Smith is both a user of a tracked media property as well as one of the users 160 of the digital networks 150.

In a particular example, a digital network, such as a social network, may solicit bids for messaging actions directed to specific attributes of members of the social network. To illustrate, an advertiser may bid to initiate a messaging action to members of the social network who, according to their social networking profiles, match the attributes "female," "unmarried," and "age 21-30." As further described herein, during initiation of messaging actions, the measurement system 120 may target individual users (e.g., John Smith) of a social network if permitted to do so by the social network.

Some or all of the attributes tracked by the measurement system 120 (also referred to herein as "first attributes") may correspond to some or all of the attributes for which messaging actions are available at the digital networks 150 (also referred to herein as "second attributes"). For example, the measurement system 120 may collect data indicating which users of a media property like a particular television show. One or more of the digital networks 150 may offer messaging actions targeted to a subset of the users 160 who are members of a fan group dedicated to the particular television show. One non-limiting example of a messaging action is purchasing targeted advertising. Members of a fan group dedicated to the particular television show may have similar attributes to users of the media property who like the particular television show (e.g., may share other affinities, demographic attributes, etc.). As further described herein, by identifying and initiating messaging actions directed to the "related" second attributes instead of or in addition to purchasing advertising directed to the first attributes, the reach extension module 124 may improve results of a messaging action (e.g., by initiating messaging actions targeted to users who may share interests, demographic attributes etc., with a target segment and may therefore be more likely to respond to the messaging action), decrease advertising cost, and/or increase advertising reach.

In a particular embodiment, the measurement system 120 generates, maintains, stores, and/or accesses one or more mapping databases 126 that store mappings between the first attributes and the second attributes. For example, such attribute mappings may be one-to-one, one-to-many, many-to-one, and/or many-to-many relations that are stored in tables or other data structures. In alternative embodiments, the mapping databases 126 may be stored externally to the measurement system 120 or as part of the reach extension module 124. The mappings database 126 may maintain a mapping between attributes tracked by the measurement system 120 and attributes associated with each of the digital networks 150 for which messaging actions are available (e.g., targeted advertising, e-mail, text message, social networking message, push notification, etc.). The mappings may be user-defined (e.g., by an administrator of the measurement system 120) and/or automatically determined (e.g., based on a fuzzy logic algorithm, a pattern matching algorithm, an advertising attribute ontology, etc.). An illustrative example of attribute mappings is further described with reference to FIG. 3.

The measurement system 120 may further include or have access to a messaging action history database 128. The messaging action history database 128 may be configured to store data indicating reach, price, yield, or a combination thereof of messaging actions initiated at the digital networks 150. For example, the messaging action history database 128 may store data indicating a number of impressions, a number of unique impressions, a number of engagements, a number of conversions, or a combination thereof. As used herein, a number of impressions indicates how many devices displayed a message as a result of a messaging action, a number of engagements indicates how many devices interacted with the message (e.g., a "click" on a hyperlink in the message), and a number of conversions indicates a number of times a desired action was taken by devices (or users thereof) after displaying the message (e.g., a number of purchased a products, a number of new enrollments in a program, a number of pledges to an organization, etc.). "Reach" may represent a number of unique views for the message, a number of people who interact with the message, a number of people who take the desired action as a result of the message, or any combination thereof. Yield may represent a total number of times the desired action is taken in response to the message. The messaging action history database 128 may store cost data such as total cost of a messaging action campaign, cost per conversion, cost per impression, cost per unique impression, or a combination thereof. While reach, cost, and yield are described to vary for messaging actions depending on the attribute targeted, it should be noted that reach, cost, and yield may also vary by type of messaging action. For example, a text message messaging action may have a different cost/reach/yield than an e-mail.

In operation, the measurement system 120 may receive data identifying a target segment 110. In particular embodiments, the data identifying the target segment 110 may be received from a web application or other application that provides a user interface (UI) that is operable to configure the measurement system 120. For example, the target segment 110 may correspond to users who have performed a desired action in the past (e.g., watched a movie, read a book, indicated a certain opinion, liked a particular product, etc.) Alternatively, the data identifying the target segment may be programmatically (e.g., automatically) selected based on a probability of audience conversion or previous advertising campaign success, as further described herein. The target segment 110 may correspond to a segment of one or more media properties tracked by the measurement system 120. The one or more media properties may or may not be commonly owned. A client of the measurement system 120 (e.g., an advertiser or other entity) may be interested in initiating messaging actions to people similar to the target segment 110 (e.g., to "amplify" or "drive" the action or behavior corresponding to the target segment 110). For example, the target segment 110 may correspond to users of one or more media properties who watched a video, and the client of the measurement system 120 may be interested in initiating messaging actions to people likely to watch the video or a similar video. As another example, the advertiser may be a coffee vendor that is determining how to present a newly created video advertisement for a coffee product. In this example, the target segment 110 may be a "likes coffee" segment or a "likes particular coffee brand" segment.

The reach extension module 124 may determine a first list of attributes associated with the target segment 110. For example, the first list of attributes may include attribute(s) tracked by the measurement system 120 that are associated with at least one member of the target segment 110. In addition, the reach extension module 124 may determine one or more attributes that are correlated to the attributes of the first list. For example, the "likes coffee" target segment 110 may include a large number of users with an attribute "job starts before 7 AM." The reach extension module 124 may identify that an attribute "is a police officer" has a high degree of correlation with the attribute "job starts before 7 AM." Thus, the "police officer" attribute may be determined by the reach extension module 124 to be correlated to the attribute "job starts before 7 AM." Thus, the reach extension module 124 may determine that the coffee-related messaging actions (e.g., advertisements) may be effectively targeted to users in the digital networks 150 that have attributes matching or similar to the "likes coffee," "job starts before 7 AM," and/or "police officer" attributes tracked by the measurement system 120.

To identify attributes in the digital networks 150 that match or are similar to "likes coffee," "job starts before 7 AM," and "police officer," the reach extension module 124 may access the mapping databases 126. To illustrate, the mapping databases 126 may store data indicating that the first list of attributes "likes coffee," "job starts before 7 AM," and "police officer" maps to a second list of attributes (e.g., "likes early morning radio," "caffeine lovers," "police union," etc.) for which a messaging action is available at a particular digital network. The reach extension module 124 may determine metrics, such as an estimated cost (e.g., cost per conversion), an estimated reach (e.g., a number of unique views), and an estimated yield (e.g., a number of desired actions, such as purchases, that are taken) for messaging actions targeted to different combinations of attributes in the second list. For example, a particular second list corresponding to a particular digital network may include the attributes "police union" (e.g., indicating that a user is a member of a police union social networking group) and "likes coffee brand M" (e.g., indicating that a user is a "fan" of coffee brand M in a social network). The reach extension module 124 may determine metric(s) (e.g., estimated cost, estimated reach, estimated yield, or a combination thereof) for messaging actions in the particular digital network targeted to the "police union" attribute, the "likes coffee brand M" attribute, and a combination of both attributes. It should be noted that the estimated cost may include lost opportunity costs associated with users who react negatively to messaging actions. For example, a particular user who may have bought a product if not for receiving a targeted messaging action may account for a portion of the estimated cost of the messaging action. Further, the estimated cost may not be stored as a monetary value. For example, estimated cost may correspond to votes lost in a political campaign as a result of initiating targeting messaging actions.

In a particular embodiment, the estimated cost, the estimated reach, the estimated yield, or a combination thereof of messaging actions directed to a particular attribute (as used herein, messaging actions directed to a particular attribute refers to messaging actions directed to users who have, exhibit, or are associated with the particular attribute) may be calculated based on data stored in the segment databases 140. Thus, the data in the segment databases 140 may be used to estimate messaging action efficacy in the external digital networks 150. For example, the measurement system 120 may determine a "degree of correlation" between the target segment 110 (e.g., the "likes coffee" segment) and each attribute or combination of attributes identified by the reach extension module 124 (e.g., the "likes coffee" attribute, the "job starts before 7 AM" attribute, and the "police officer" attribute). A correlation of the "likes coffee" attribute to the "likes coffee" segment may be 1, because each user in the "likes coffee" segment has the attribute "likes coffee"=1 (or true). A correlation of a "police officer" attribute to the "likes coffee" segment may be 0.7 based on data in the segment databases 140 indicating that 70% of users in the "police officer" segment are also in the "likes coffee" segment (e.g., have the attribute "likes coffee"=1). Correlation data may also be calculated for custom segments defined using set unions and/or intersections (e.g., a "police officers who like coffee" segment defined by performing a set intersection on the "police officer" segment and the "likes coffee" segment).

The reach extension module 124 may use the correlation data to estimate reach and cost for each combination of mapped attributes in the digital networks 150. To illustrate, in the above example in which an advertiser is presenting a coffee-related advertisement, a digital network may have 3,000 users that are members of a police union. To determine an estimated reach of a coffee-related advertisement directed to the "police union" attribute, the reach extension module 124 may apply the previously determined correlation between "likes coffee" and "police officer" of 0.7 to the number of members of the police union. Thus, the reach extension module 124 may determine the estimated reach as 3,000*0.7=2,100.

In a particular embodiment, the segment databases 140 may include information indicating a frequency of actions carried out by users. For example, the segment databases 140 may include information indicating that, on average, coffee drinkers (e.g., user in a "likes coffee" segment) drink 1.5 cups of coffee per day. Thus, the reach extension module may determine that an estimated yield of initiating a messaging action (e.g., an advertisement) designed to encourage coffee drinking directed to members of the police union is 2,100*1.5=3,150 cups of coffee per day.

In addition or in the alternative, the reach extension module 124 may determine estimated cost, estimated reach, and estimated yield based at least in part on historical data received from the messaging action history database 128. For example, the messaging action history database 128 may include information indicating reach, cost, and yield of a prior advertising campaign for coffee directed to police officers. The reach extension module 124 may use the advertisement history information as an estimated cost, estimated reach, and estimated yield or may weight/adjust the estimated cost, the estimated reach, and the estimated yield based on the advertisement history information. For example, the reach extension module 124 may average the estimated cost, the estimated reach, and the estimated yield with the advertisement history data to produce a weighted cost, a weighted reach, and a weighted yield.

One or more of the attributes identified by the reach extension module 124 may be used to initiate messaging actions. For example, the reach extension module 124 may initiate (e.g., initiate purchase of, initiate transmission of, etc.) messaging actions based on an attribute of a target segment, a first attribute associated with at least one member of the target segment, a second attribute determined to be related to the first attribute, or a combination thereof. In the coffee-related advertisement example, the target segment 110 is "likes coffee," the first attribute may be "job starts before 7 AM" and the second attribute may be "is a police officer." Thus, one or more of the attributes "likes coffee," "job starts before 7 AM," and "is a police officer" may be used. At a first digital network, targeted messaging actions directed to users who like coffee (e.g., directed to the "likes coffee brand M" attribute at the digital network) may have a particular estimated cost (e.g., $4 per user reached), a particular estimated reach (e.g., 1,000 users), and a particular estimated yield (e.g., 1,500 coffee purchases per day). Similarly, targeted advertising directed to police officers (e.g., directed to the "police union" attribute at the digital network) may have an estimated cost of $1 per user, an estimated reach of 2,100 users, and an estimated yield of 3,150 coffee purchases per day. Targeted messaging actions directed to people who start work before 7 AM (e.g., a "likes early morning radio" attribute at the digital network) may have an estimated cost of $2 per user reached, an estimated reach of 800 users, and an estimated yield of 1,200 coffee purchases per day.

In a particular embodiment, the reach extension module 124 may determine that one or more messaging actions targeted to one attribute at a digital network is likely to be more effective (e.g., cost effective) than one or more messaging actions targeted to another attribute. For example, as described above, a target segment of coffee drinkers may include people who start work before 7 AM. Being a police officer may be correlated with starting work before 7 AM. In a particular digital network, messaging actions directed to police officers may have an estimated cost, an estimated reach, an estimated yield or a combination thereof, that is more cost effective (e.g., lower cost, a larger reach, a larger yield, or a combination thereof) than messaging actions directed to people who start work before 7 AM. In the above example, the cost per user reached for messaging actions directed to people who start work at 7 AM (e.g., the "likes early morning radio" attribute) is $2 and the cost per user reached directed to police officers (e.g., the "police union" attribute) is $1. Therefore, the reach extension module 124 may automatically initiate messaging actions targeted to users with attributes corresponding to police officers (e.g., the "police union" attribute of the digital network) instead of messaging actions directed to users who start work before 7 AM.

In a particular embodiment, the reach extension module 124 may initiate messaging actions based on an estimated yield. For example, the estimated cost per additional cup of coffee sold per day may be 75 cents for messaging actions directed to people who start work at 7 AM (e.g., the "likes early morning radio" attribute) and the estimated cost per additional cup of coffee sold per day may be 68 cents for messaging actions directed to people who are police officers (e.g., the "police union" attribute). Therefore, the reach extension module 124 may automatically initiate messaging actions targeted to more users with attributes corresponding to police officers (e.g., the "police union" attribute of the digital network) than users who start work before 7 AM.

Alternately, the reach extension module 124 may utilize a first portion of a budget to initiate targeted messaging actions directed to coffee drinkers, a second portion of the budget to initiate targeted messaging actions directed to users who start work before 7 AM, and/or a third portion of the budget to initiate targeted messaging actions directed to police officers. The ratios of the first portion, the second portion, and/or the third portion of the budget may be based on the estimated costs, the estimated reaches, the estimated yields, or a combination thereof of the corresponding targeted messaging action. The ratios may also be determined based on historical success of previous advertising campaigns. To illustrate, lower-cost and/or higher-reach/yield attributes may be purchased in larger proportions than higher-cost and/or lower-reach/yield attributes.

In a particular embodiment, the reach extension module 124 may make messaging decisions by determining that a messaging action satisfies message criteria 112. The message criteria 112 may be received from a client application (e.g., a web application, a mobile phone application, or any other application). The message criteria 112 may indicate that targeted messaging actions directed to an attribute should be initiated at a digital network when a particular number of members of the digital network exhibit the attribute. In addition or in the alternative, the message criteria 112 may indicate that the targeted messaging action should be initiated when an estimated cost (e.g., monetary cost, negative reactions, loss of good will, etc.) of the targeted messaging action satisfies (e.g., is less than) a cost threshold. Further, the message criteria 112 may indicate that the targeted messaging action should be initiated when an estimated reach of the targeted advertising satisfies (e.g., is greater than) a reach threshold. In addition or in the alternative, the message criteria 112 may indicate that the targeted messaging action should be initiated when an estimated yield of the targeted messaging action satisfies (e.g., is greater than) a yield threshold). In a particular embodiment, the message criteria 112 indicates that when a combination of estimated reach, estimated cost, and estimated yield (e.g., cost per audience member reached or cost per action caused) satisfies a threshold, the targeted messaging action should be initiated. In a particular embodiment, targeted messaging actions directed to more than one attribute may satisfy the message criteria. The reach extension module 124 may evaluate each potential targeted messaging action that satisfies the message criteria 112 and select a combination of the messaging actions based on estimated cost, estimated reach, estimated yield or a combination thereof. For example, the reach extension module 124 may initiate targeted messaging actions to achieve a highest estimated reach at a cost that is less than or equal to a budget. Further, the reach extension module 124 may initiate targeted messaging actions to achieve a highest estimate yield at a cost that is less than or equal to the budget. The estimated yield may be a function of the estimated reach.

In a particular embodiment, the reach extension module 124 develops a messaging strategy based on the estimated cost, the estimated reach, the estimated yield, or a combination thereof of targeted messaging actions available for one or more attributes and initiates targeted messaging actions based on the messaging strategy (e.g., transmits bids for targeted advertising to one or more advertising networks, initiates transmission of e-mails, initiates transmission of text messages, etc.). The messaging strategy may be further based on the message criteria 112. The message criteria 112 may indicate a number of members (e.g., users) of a digital network that exhibit a particular attribute (e.g., only purchase advertising directed to the attribute "likes television show x" when at least 1,000 members are part of a social networking fan club for television show x). The messaging strategy may improve effectiveness of targeted messaging actions across the digital networks 150. The messaging strategy may be designed to achieve a highest estimated reach and/or estimated yield within the budget. The reach extension module 124 may continue initiating targeted messaging actions according to the messaging strategy until a budget is spent.

As targeted messaging actions are initiated and messages are transmitted to the users 160 via the digital networks 150, the reach extension module 124 may monitor actual cost, actual reach, and actual yield of the initiated targeted messaging actions, and may update the messaging action history database 128 based on the monitoring. For example, the messaging action history database 128 may include data regarding some or all previous messaging campaigns, a top 10 indexing strategies, a top 10 brand strategies, etc. When a client (e.g., advertiser) wishes to influence a particular behavior, the described techniques may include identifying target segment(s) corresponding to the behavior, checking the messaging action history database 128 to see if any previous strategies regarding the same or similar target segments exist, and then deploying a strategy/data combination that is predicted to have at least a desired cost/reach/yield. The reach extension module 124 may update an in-progress or stored messaging strategy (e.g., a previously used messaging strategy for a coffee-related messaging action campaign) based on the updated messaging action history database 128. For example, the updated messaging action history database 128 may indicate that messaging actions targeted to a particular attribute have reached fewer users than estimated, have generated fewer desired actions than estimated (i.e., have a lower yield than estimated), or have cost more than anticipated. The reach extension module 124 may issue an alert (e.g., an e-mail, a text message, a pop-up notification, etc. to a client or administrator of the measurement system 120) and/or adjust the messaging strategy to stop or slow initiation of messaging actions targeted to the particular attribute in response to the updated messaging action history database 128. Alternatively, the updated messaging action history database 128 may indicate that messaging actions directed to a certain attribute cost less, have reached more users than anticipated, or have generated more desired actions than estimated (i.e., have a higher yield than estimated). The reach extension module 124 may issue an alert to a client or administrator and/or adjust the messaging strategy to accelerate initiation of messaging actions targeted to the particular attribute. Examples of alerts and modification of messaging strategy are further described with reference to FIG. 4.

In a particular embodiment, the reach extension module 124 may recursively or iteratively refine and/or expand a messaging strategy. For example, the reach extension module 124 may generate a messaging strategy for a coffee-related messaging action campaign. Thus, in this example, the initial target segment is coffee drinkers. The messaging strategy may include initiating messaging actions directed to one or more attributes at one or more digital networks, where the one or more attributes are determined to be correlated to the segment of coffee drinkers. For example, the messaging strategy may include initiating targeted messaging actions directed to police officers, people who start work before 7 AM, light house operators, people who subscribe to a newspaper, and people who attend a yoga studio. These attributes can be considered "first-degree" attributes of the coffee drinkers target segment. The reach extension module 124 may receive information (e.g., from the one or more digital networks, such as a social network) related to performance of the targeted messaging actions directed to each of the one or more attributes and may expand and refine the messaging strategy based on the performance. For example, messaging actions targeted to police officers may be performing "well" (e.g., meeting or exceeding a particular cost, yield, or reach threshold or performing better than targeted messaging actions directed to the other attributes). In response, the reach extension module 124 may identify attributes exhibited by members of the police officers segment (e.g., subscribes to a particular magazine, has a high stress job, likes comfortable shoes, etc.) These attributes can be considered "second-degree" attributes for the original coffee drinkers target segment. The reach extension module 124 may expand and refine the advertising strategy by purchasing advertising targeted to one or more of the second-degree attributes. The reach extension module 124 may continue expanding and refining the advertising strategy in this fashion (e.g., by determining third-degree attributes, fourth-degree attributes, etc.) to extend reach for the coffee drinkers target segment. Thus, the described techniques may be used to find people with non-obvious characteristics while maintaining quality (e.g., a user acquisition cost).

Thus, the reach extension module 124 may enable automatic initiation of targeted messaging actions at multiple digital networks 150, where the initiated targeted messaging actions are directed to attributes that are highly correlated to the target segment 110. Further, the reach extension module 124 may monitor the initiated targeted messaging actions and adjust messaging strategies based on performance of the targeted messaging actions. Moreover, the reach extension module 124 may maintain mappings between first attributes tracked by the measurement system 120 (e.g., "likes coffee," "job starts before 7 AM," and "police officer") and second attributes available for purchase at each of multiple digital networks (e.g., "likes coffee brand M," "likes early morning radio," and "police union") so that targeted messaging actions may be initiated at multiple digital networks based on a common list of attributes (e.g., the first attributes).

In some embodiments, data regarding users (e.g., audience members) may be used internally within the measurement system 120 instead of, or in addition to, being used externally with respect to an advertising network, push notification system, e-mail system, etc. For example, based on data regarding users that have performed a particular behavior, similar users may be identified by internal data or an internal system 129, such as a consumer relationship management (CRM) system, an e-mail list, a transaction log, etc. Thus, the reach extension module 124 may be used to identify "new" users that an enterprise does not have a relationship with as well as "known" users that the enterprise has an existing relationship with (e.g., users that the measurement system 120 is aware of). As an illustrative non-limiting example, the reach extension module 124 may determine that a large percentage of coffee drinkers age 44-51 have performed a behavior of interest (e.g., read an article). Based on such information, the reach extension module 124 may identify other users from an internal e-mail list that are also coffee drinkers age 44-51, and are therefore likely to perform the behavior (e.g., read the article or a different article). The reach extension module 124 may use such data (e.g., "coffee drinkers" and "age 44-51") to initiate an internal messaging action (e.g., send a targeted e-mail) to drive the desired behavior. For example, the targeted e-mail may be sent by the measurement system 120 (or a component thereof) to other users tracked by the measurement system 120 that have not performed the target behavior.

Figure 2:
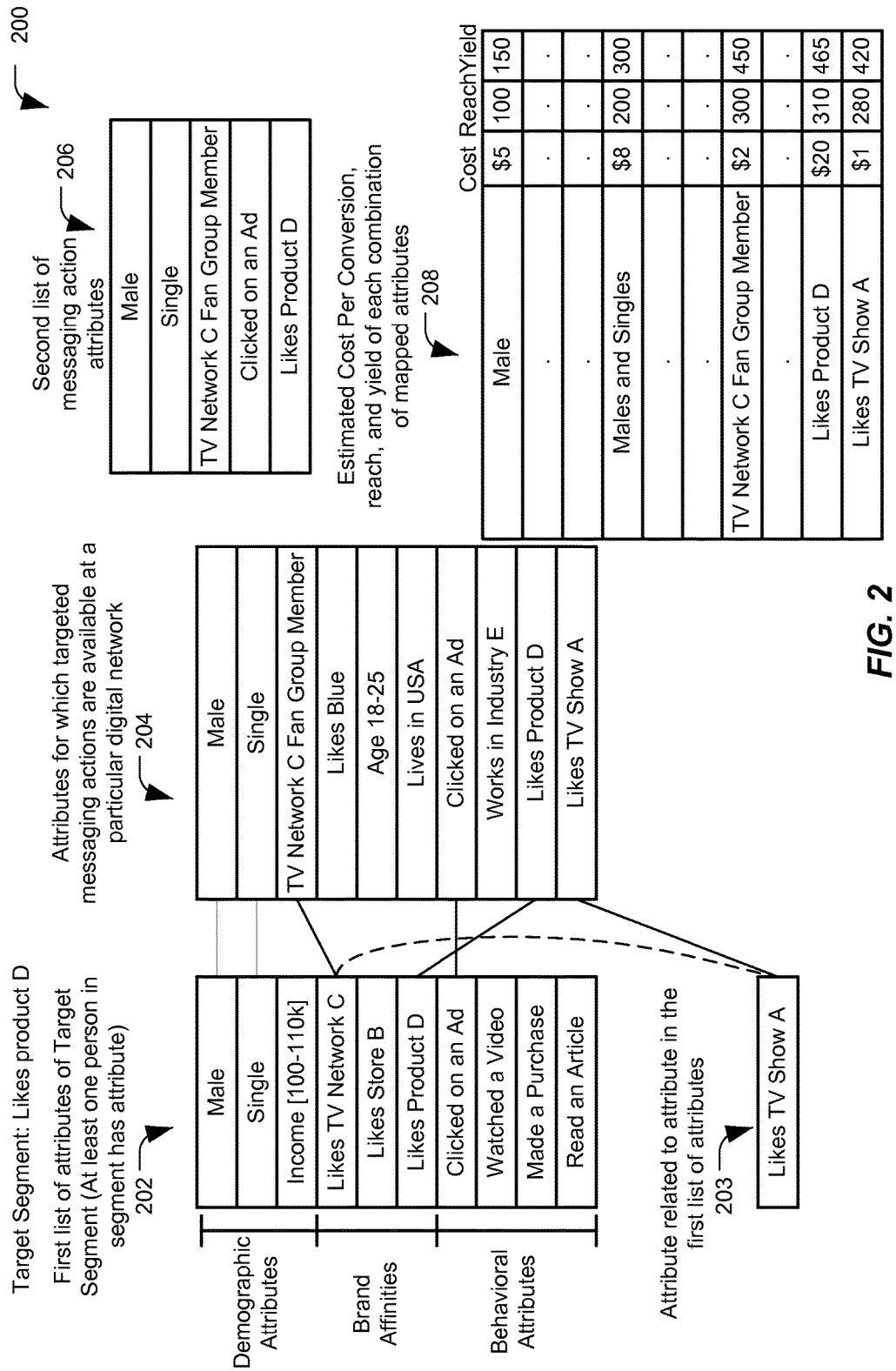
FIG. 2 is a diagram to illustrate automatic targeted messaging actions.

FIG. 2 is a diagram 200 illustrating automatic targeted messaging actions. In an illustrative embodiment, the automatic initiation of targeted messaging actions may be performed by a reach extension module, such as the reach extension module 124 of FIG. 1.

In operation, a reach extension module may receive data identifying a target segment (or identification thereof). The target segment may be associated with a desired behavior that a content producer wishes to drive. In the illustrated example, the target segment includes users who like a product D (e.g., a content producer may wish to drive purchases of product D). The reach extension module may generate a first list 202 of attributes associated with at least one member of the target segment. For example, in the segment databases 140, users x, y, and z may be members of a likes product D segment. The first list 202 may include attributes of the users x, y, and/or z (e.g., if one or more of the users x, y, and z are male, then the first list 202 may include an attribute "male"). The attributes of the first list 202 may include demographic attributes (e.g., gender, age, income, etc.), brand affinities (e.g., brands "liked" by the users of the target segment), behavioral attributes (e.g., actions performed by the users of the target segment), or any combination thereof.

In particular embodiments, the reach extension module may also identify one or more attributes that are related to the attributes in the first list 202. For example, a related attribute 203 "likes TV show A" is related to an attribute "likes TV network C" of the first list 202. In FIG. 2, the relation between the attribute "likes TV show A" and the attribute "likes TV network C" is illustrated by a dashed line. The related attribute 203 may be identified based on a correlation between users liking TV network C and users liking TV show A, as described with reference to FIG. 1. Further, although one related attribute 203 is shown in FIG. 2, it will be understood that in alternate embodiments multiple related attributes may be identified.

The reach extension module may map the first list 202 and the related attribute 203 to attributes 204 for which targeted messaging actions are available at a particular digital network to generate a second list 206 of attributes. For example, the reach extension module 124 of FIG. 1 may receive a map from the mapping databases 126. The map may identify relationships between attributes of the first list 202 and the attributes 204. The second list 206 of attributes may thus include attributes for which targeted messaging actions are available at the digital network and are predicted to be successful in reaching the target segment.

For each attribute and each combination of attributes of the second list 206, the reach extension module may calculate an estimated cost, an estimated reach, and an estimated yield. The reach extension module may store the estimated cost and the estimated reach of each attribute and each combination (e.g., in a data structure, such as illustrative table 208). In a particular embodiment, the estimated cost is an estimated cost per user reached and the estimated reach indicates an estimated number of unique views for an advertisement. The estimated yield may correspond to an estimated number of desired actions taken (e.g., purchases of product D) in response to a messaging action. In alternate embodiments, different cost, reach, and yield metrics may be used.

In a particular embodiment, cost and reach may be estimated by determining a correlation between each attribute of the first list 202 with the target segment. The correlations may correspond to correlations between the attributes and the target segment in a segment database, such as the segment databases 140. The correlations may be applied to data regarding the attributes of the second list 206 received from the digital network. For example, data regarding estimated audience size and estimated cost per view for each attribute of the second list 206 may be received from the digital network. The correlations may be used to predict user behavior and may be combined with the data received from the digital network to generate estimated cost and estimated reach for each combination of attributes of the second list 206. For example, an attribute A of the first list 202 may have a 0.5 correlation to a target segment X. An attribute B of the second list 206 may be mapped to (i.e., correspond to) the attribute A and may also have a 0.5 correlation to the target segment X. The reach extension module 124 may receive data indicating that a digital network has 20 users with attribute B and that a cost per unique view of advertising directed to users with attribute B is $2. Based on the 0.5 correlation, the reach extension module 124 may predict that 10 of the 20 users with attribute B would, if tracked by the measurement system 120, be classified into target segment X. Therefore, the reach extension module 124 may determine that 10 target users may be reached for $40 if the reach extension module initiates targeted messaging actions directed to attribute B.

The segment database may further include frequency information indicating how often a particular action is taken. For example, the segment database may indicate that users who like product D buy product D, on average, 1.5 times per year. The frequency information may be used to determine an estimated yield of targeting messaging action directed to each attribute of the first list 202. Thus, the estimated yield for targeted messaging actions directed to attribute B may be 15 purchases per year.

In addition or in the alternative, the estimated cost, estimated reach, and the estimated yield may be based on messaging action history data such as messaging action history data stored in the messaging action history database 128 of FIG. 1. For example, the messaging action history data may include information related to actual reach, actual cost, and actual yield of past targeted messaging actions.

The reach extension module may initiate targeted messaging actions based on the table 208. For example, the reach extension module may compare estimated costs, estimated reaches, and estimated yields to decrease an estimated cost per conversion, increase an estimated reach, increase an estimated yield, or a combination thereof. For example, the first list 202 may include a "likes product D" attribute with a corresponding "likes product D" attribute available for targeted messaging actions at the digital network. The "likes product D" attribute of the first list 202 may be shared by 100% of the "likes product D" target segment. Therefore, the table 208 may include a relatively high estimated reach for messaging actions targeted to users who like product D. However, the reach extension module may further identify that a likes TV network C attribute of the first list 202 is shared by a large percentage of the likes product D target segment. In addition, a corresponding TV network C fan group member attribute available for targeted messaging actions at the digital network may have a relatively lower estimated cost. Based on comparisons between the estimated costs, estimated reaches, and estimated yields of messaging actions directed to users who like product D and messaging actions directed to TV network C fan group members, the reach extension module may determine that initiating messaging actions targeted to TV network C fan group members is predicted to be the more cost/reach/yield-effective option. The reach extension module may thus initiate messaging actions targeted to TV network C fan group members at the digital network. Similarly, the reach extension module may determine to initiate targeted messaging actions based on the related attribute 203 "likes TV show A" rather than or in addition to messaging actions based on the first list 202 of attributes based on the comparisons.

In a particular embodiment, the reach extension module may compare estimated costs/reaches/yields to threshold costs/reaches/yields. When the estimated cost, reach, yield or a combination thereof for a particular targeted messaging action meets a threshold, the reach extension module may automatically initiate the particular targeted messaging action. For example, the reach extension module may automatically initiate targeted messaging actions if an associated estimated reach or yield is above a particular threshold or if an estimated cost is below a particular threshold. Further, the reach extension module may receive updates from the digital network or from servers indicating user interactions with the initiated messaging actions as well as actual cost data. Additionally, the reach extension module may receive updates from a segment database indicating that a correlation between an attribute tracked by the measurement system and the target segment has changed. The reach extension module may update the table 208 based on the received updates and modify messaging strategies based on the updated table 208. For example, the reach extension module may issue an alert or may stop or slow initiation of messaging actions targeted to TV network C fan group members when the updated table 208 indicates an increased price, a decreased reach, a decreased yield or a combination thereof. In another example, the reach extension module may initiate messaging actions (or additional messaging actions) targeted to TV network C fan group members at an increased rate when the updated table 208 indicates a decreased price, an increased reach, an increased yield, or a combination thereof.

Thus, as illustrated in FIG. 2, a reach extension module (e.g., the reach extension module 124 of FIG. 1) may automatically initiate messaging actions targeted to users having attributes that are similar to a target segment. The reach extension module may further monitor the success of the initiated messaging actions and adjust future messaging actions accordingly (e.g., by increasing messaging actions or decreasing messaging actions based on the success).

Figure 3:
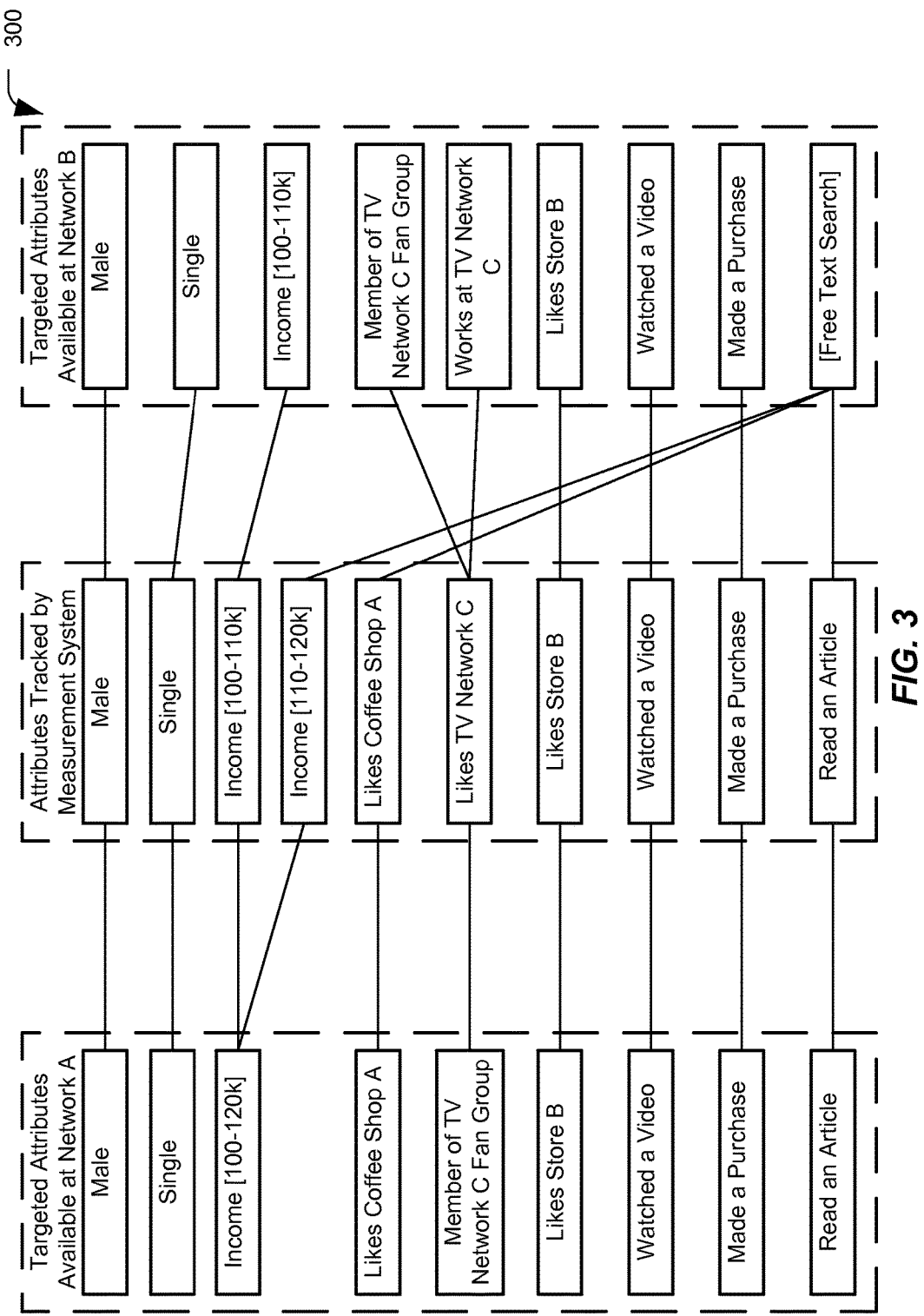
FIG. 3 is a diagram to illustrate a particular embodiment of an attribute mapping used by the system of FIG. 1.

Referring to FIG. 3, a diagram 300 illustrating mappings between attributes tracked by a measurement system and attributes for which targeted messaging actions are available at particular digital networks is shown. In an illustrative embodiment, the measurement system may be the measurement system 120 of FIG. 1 and the digital networks may be the digital networks 150 of FIG. 1. The mappings illustrated in FIG. 3 may be stored in one or more mapping databases, such as the mapping databases 126 of FIG. 1. As illustrated in FIG. 3, attribute mappings may be one-to-one, one-to-many, and/or many-to-one. Attribute mappings may be automatically generated and/or manually created by a user/administrator. As described with reference to FIGS. 1-2, a reach extension module (e.g., the reach extension module 124 of FIG. 1) may identify a first list of attributes (e.g., "likes TV network C") that are tracked by the measurement system 120 and that are associated with a target segment. The reach extension module may use the attribute mappings of FIG. 3 to identify corresponding attributes (e.g., "member of TV network C fan group", "works at TV Network C," etc.) available for targeted messaging actions at various digital networks. In a particular embodiment, one or more attributes may be mapped to a "Free Text Search" option at a digital network. In the example of FIG. 3, the attributes "Income [110-120 k]" and "Likes Coffee Shop A" in the measurement system do not have corresponding attributes at Digital Network B. Instead, the attributes are mapped to a "Free Text Search," indicating that when initiating messaging actions directed to such attributes, a reach extension module would initiate a text-based search of user profiles in Digital Network B to identify users of interest.

Figure 4:
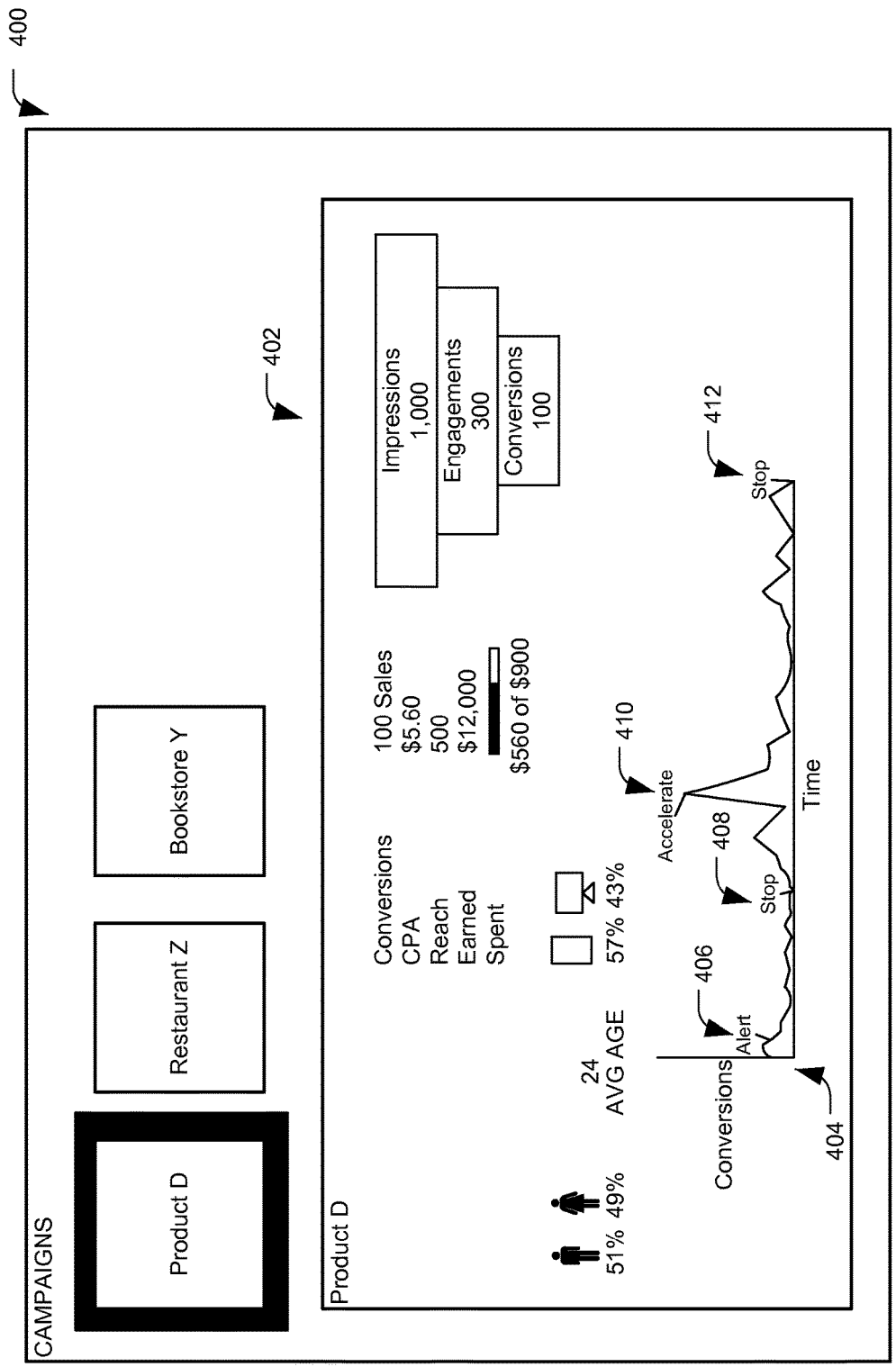
FIG. 4 is a diagram to illustrate a particular embodiment of a graphical user interface (GUI) associated with initiating messaging actions based on audience attributes.

Referring to FIG. 4, a messaging action campaign graphical user interface (GUI) 400 is illustrated. In an illustrative embodiment, the GUI 400 may be displayed by a web application in communication with a measurement system, such as the measurement system 120 of FIG. 1. For example, the GUI 400 may be displayed to an advertiser, a media property owner, an administrator of the measurement system 120 of FIG. 1, etc. to track the performance of messaging action campaigns. The GUI 400 may display statistics for a plurality of messaging action campaigns (e.g., "Product D," "Restaurant Z," and "Bookstore Y"). In FIG. 4, statistics 402 are displayed for the selected "Product D" campaign. The statistics 402 may include aggregated information regarding a plurality of messaging actions targeted to a plurality of attributes initiated by a reach extension module, such as the reach extension module 124 of FIG. 1. In FIG. 4, the statistics 402 for the "Product D" campaign are displayed using a line graph 404 that illustrates conversions (e.g., yield) over time and includes information regarding actions taken by the reach extension module. In the example of FIG. 4, an alert was issued at a first time 406 in response to a declining number of conversions. Initiation of targeted messaging actions was stopped at a second time 408 and at a fourth time 412 (e.g., when a number of conversions met a threshold number for a particular period of time). Initiation of targeted messaging actions was increased at a third time 410 in response to a rising number of conversions.

As shown in FIG. 4, the statistics 402 for a messaging action campaign may also include a number of conversions (e.g., 100), a cost per acquisition (CPA) (e.g., $5.60), a reach (e.g., 500), an amount of money earned from the conversions (e.g., $12,000), an amount of campaign budget spent/remaining (e.g., $560 of $900 spent), demographic information about an advertising audience (e.g., 51% male, 49% female, average age of 24), and/or device information (e.g., 57% mobile phones/tablet computers and 43% desktop/laptop computers). The statistics may also display a number of impressions (e.g., 1,000) and a number of engagements (e.g., 300) associated with the messaging action campaign. In alternate embodiments, a messaging action campaign GUI may illustrate, more, less, and/or different types of messaging action statistics.

Figure 5:
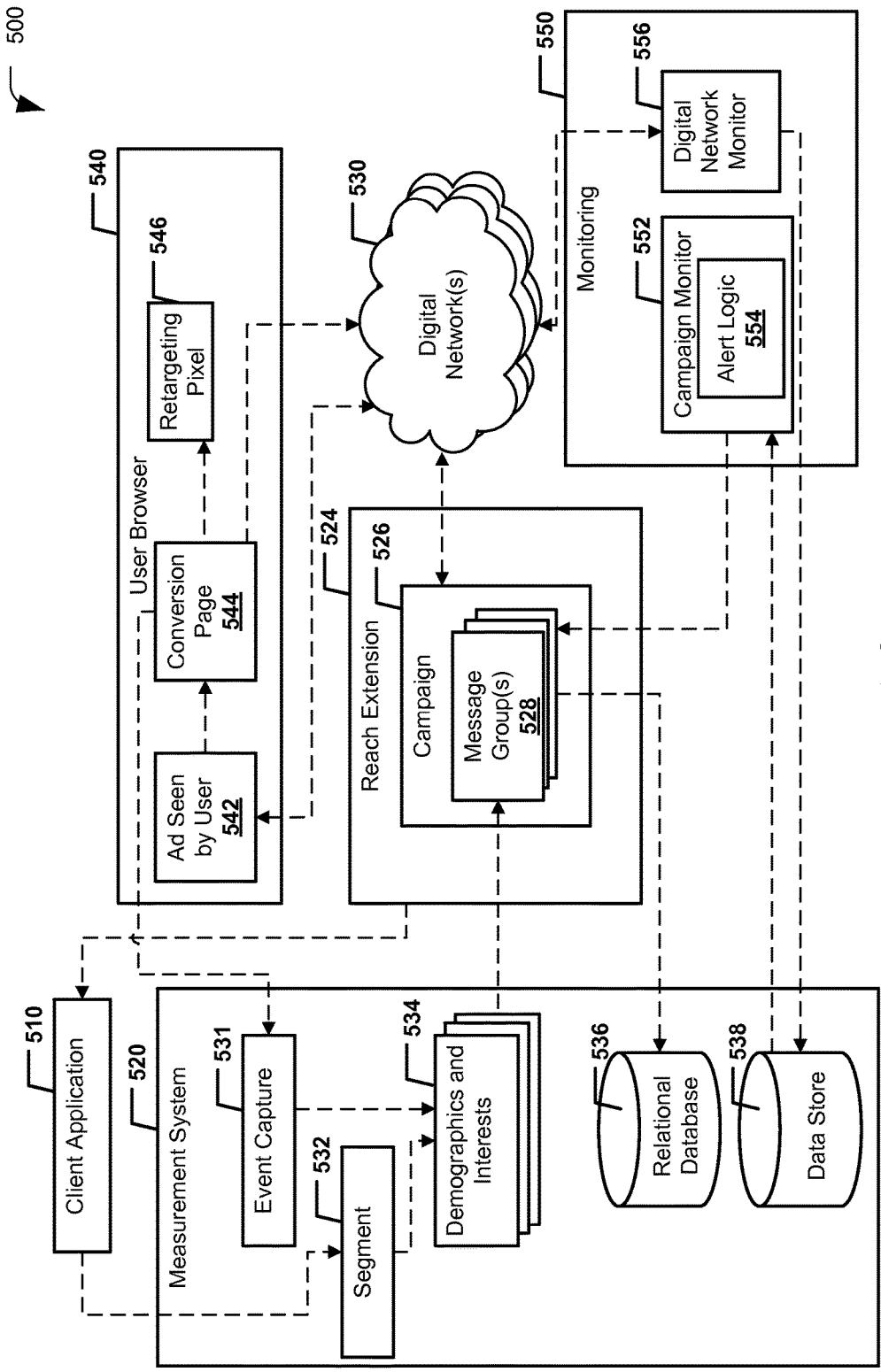
FIG. 5 is a diagram of another embodiment of a system that is operable to initiate targeted messaging actions based on audience attributes.

FIG. 5 illustrates another embodiment of a system 500 operable to initiate targeted messaging actions based on audience attributes. The system 500 includes a measurement system 520, which may, in an illustrative embodiment, correspond to the measurement system 120 of FIG. 1. The system 500 further includes a reach extension module 524 and a monitoring module 550, which may partially or collectively correspond to the reach extension module 124 of FIG. 1.

The measurement system 520 may track data regarding audience segments for one or more media properties (e.g., a website) and may store the data in a data store 538. In a particular embodiment, the data store 538 corresponds to the segment databases 140 of FIG. 1. Each audience segment may have a relation to one or more demographic attributes, brand affinities, behaviors, or any combination thereof (e.g., each member of a segment HAS an attribute, each member of the segment does NOT have the attribute, each member of the segment has a first attribute AND a second attribute, each member of the segment has the first attribute OR the second attribute, etc.).

In operation, the measurement system 520 may receive data indicating selection of a segment 532 from a client application 510 (e.g., a web browser executing at a computing device associated with an advertiser). The segment 532 may be associated with one or more media properties. The selection of the segment 532 may indicate that a client (e.g., an advertiser) wishes to initiate messaging actions targeted to users similar to members of the segment 532 (e.g., to drive a behavior associated with the members of the segment 532). For example, the segment 532 may correspond to users who watched a previous coffee-related advertisement. Based on a low cost, a high yield, a high reach, or a combination thereof of the previous advertisement, an advertiser may select the segment 532 to target the same (or similar) users with a new advertisement for a new coffee-related product. In response to the selection, the measurement system 520 may identify first attributes 534 (e.g., demographic attributes and interests) for each member of the segment 532. Data indicating the first attributes 534 may be sent to the reach extension module 524 to create a messaging action campaign 526. In a particular embodiment, data identifying second attributes that are correlated to the first attributes 534 is also sent to the reach extension module 524 to create the messaging action campaign 526, as described with reference to FIGS. 1-2.

The messaging action campaign 526 includes message groups 528. The message groups 528 may include a message group for each combination of the first and second attributes for each of the digital networks 530. Each message group of the message groups 528 may include one or more third attributes for which targeted messaging actions are available.

The reach extension module 524 may analyze each message group of the message groups 528 to determine an estimated cost, an estimated reach, and an estimated yield of messaging actions based on the message group. The estimated cost, the estimated reach, and the estimated yield may be estimated based on data stored in the data store 538 (e.g., past cost, past reach data, past yield data, correlation data, etc.) and messaging strategies stored in a relational database 536. When the estimated cost, the estimated reach, the estimated yield, or a combination thereof, of a particular message group meets a threshold, the reach extension module 524 may create messaging strategy to automatically initiate targeted messaging actions. The targeted messaging actions may correspond to the particular message group at a particular digital network of the digital networks 530. The reach extension module 524 may store information regarding the message strategy in the relational database 536 of the measurement system 520. The information may identify the segment 532, an estimated cost, an estimated reach, an estimated yield, specific targeted messaging actions to be initiated, or a combination thereof.

In the illustrated example, the initiated targeted messaging actions include an advertisement 542 to be presented to a user (e.g., an individual viewing a website) via a user browser 540. In other examples, the messaging actions may include other types of messaging actions in addition to or instead of the advertisement 542. The particular digital network may count impressions (e.g., a number of times the advertisement 542 has been seen by users) resulting from the targeted advertising. When the user clicks on the advertisement 542, the user browser 540 may display a conversion page 544. The conversion page 544 may correspond to a web page of the client. The conversion page 544 may also be displayed responsive to an action within a mobile application (e.g., a purchase) or an action at a specific venue (e.g., a RFID "check-in"). In particular embodiments, the particular digital network counts a number of clickthroughs (e.g., a number of times users click on the advertisement 542).

From the conversion page 544, the user may initiate a conversion event (e.g., buying an advertised product or service from the client, watching a video, etc.). The conversion event may result in a conversion "pixel" (e.g., message or data) being sent to the particular digital network notifying the particular digital network that the conversion event occurred. In addition, an event capture module 531 may capture the conversion event and update the first attributes 534 accordingly (examples of an event capture module capturing events are described in reference to FIG. 8). Thus, the conversion event can be associated with users of certain demographics and interests, which may enable a system (e.g., the measurement system 120 of FIG. 1) to find additional users that are similar to users that are converting. The updated first attributes 534 may in turn be used to update the message groups 528.

In a particular embodiment, the user browser 540 may receive a retargeting "pixel" 546 from the conversion page 544. The retargeting pixel 546 may be observed by one or more of the digital networks 530 and used to send particular advertising to the user browser 540. To illustrate, one of the benefits of attributing conversion(s) to a specific audience is an ability to value the audience for retargeting. For example, different bids and budgets may be used for different retargeting segments.

A digital network monitor 556 of the monitoring module 550 may receive updates from the digital networks 530 (e.g., the digital networks 530 may send updates periodically or when a particular message is viewed or clicked on). The updates may include performance data related to particular targeted messaging actions, such as cost per message, a number of impressions, a number of conversions, total money spent, or a combination thereof. The digital network monitor 556 may update the data store 538 based on the performance data.

A campaign monitor 552 of the monitoring module 550 may monitor the performance data stored in the data store 538. Based on the performance data, alert logic 554 of the campaign monitor 552 may issue commands to the reach extension module 524 to adjust the message strategy. For example, the alert logic 554 may issue a command to increase targeted messaging actions based on a particular message group of the message groups 528 in response to detecting that a reach, a number of conversions (e.g., a yield), a cost, or a combination thereof, associated with the messaging actions based on the particular message group meets a first threshold. Alternatively, the alert logic 554 may issue a command to decrease messaging actions, stop messaging actions, issue a warning, or a combination thereof in response to detecting that the reach, number of conversions, cost, or a combination thereof, associated with the messaging actions based on the particular message group meets a second threshold. In response to the command from the alert logic 554, the reach extension module 524 may alter the message strategy and update (e.g., by changing the message strategy to increase, decrease, or stop initiation of messaging actions) the advertising strategy stored in the relational database 536. The reach extension module 524 may continue to initiate messaging actions according to the updated message strategy. When the alert logic 554 of the campaign monitor 552 issues a stop command, the reach extension module 524 may stop initiating messaging actions. In a particular embodiment, the reach extension module 524 may stop initiating messaging actions for a period of time before automatically resuming initiating messaging actions in response to the period of time elapsing. In an alternate embodiment, the reach extension module 524 may stop initiating messaging actions until a command is received to continue initiating messaging actions (e.g., from the alert logic 554 or from a content producer).

Thus, the system 500 may automatically initiate targeted messaging actions that are more likely to reach users with certain attributes. The targeted messaging actions may thus be sent to users more likely to perform a desired action than a random sampling of people. The targeted messaging actions may be based on estimated costs and effectiveness data (e.g., how well an audience performs a desired behavior), which may be updated as messaging actions are initiated. The updated cost and effectiveness data may be used to update a message strategy.

Figure 6:
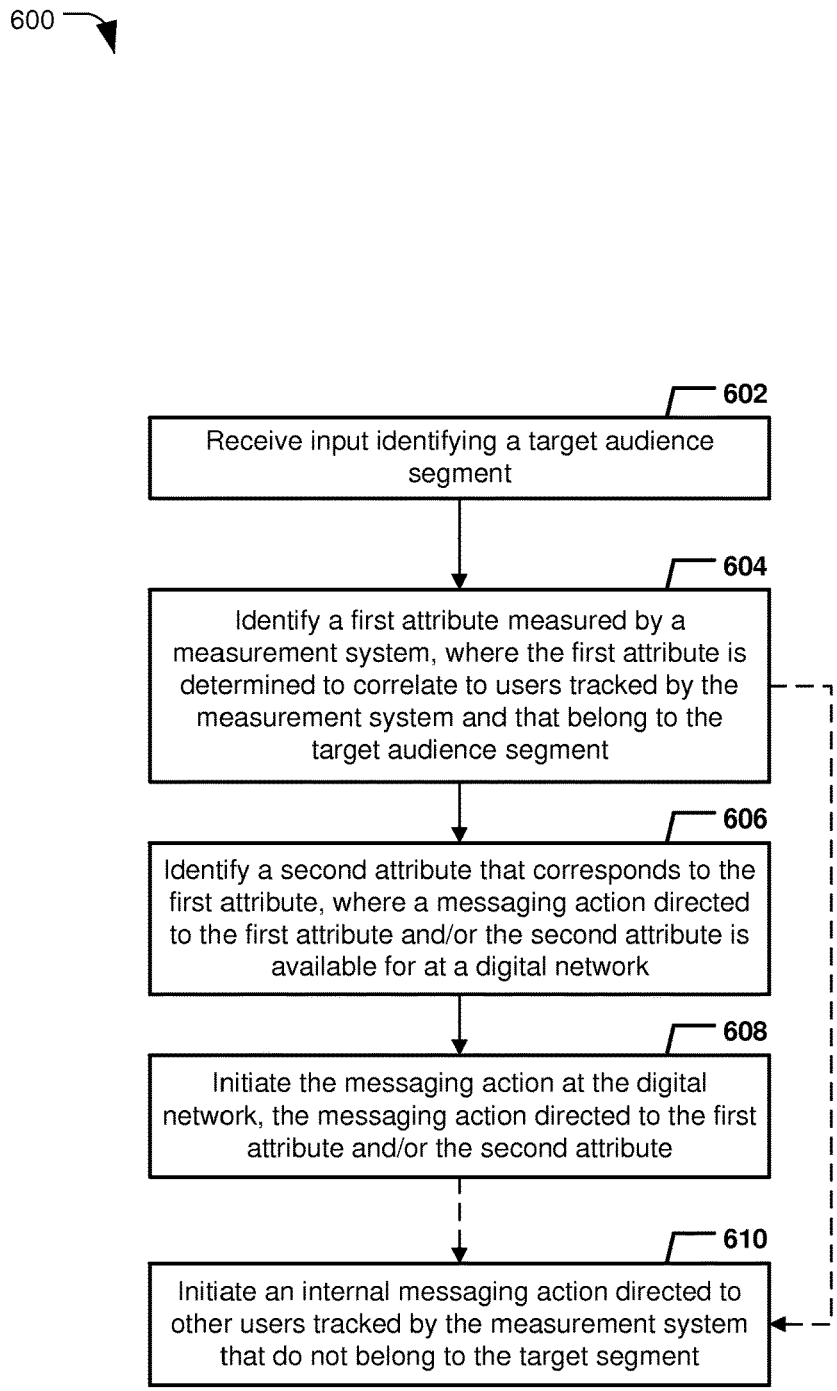
FIG. 6 is a flowchart to illustrate a particular embodiment of a method of initiating targeted messaging actions.

Referring to FIG. 6, a method 600 of initiating targeted messaging actions is shown. In an illustrative embodiment, the method 600 may be performed by a measurement system, such as the measurement system 120, the measurement system 520 of FIG. 5, or a measurement system as further described with reference to FIGS. 8-9.

The method 600 includes receiving input identifying a target audience segment, at 602. For example, the measurement system 120 of FIG. 1 may receive input (e.g., from a client application, such as a web client, in response to user selection) identifying the target segment 110. As another example, the measurement system 520 may receive input identifying the segment 532 from the client application 510 (e.g., in response to a user selection). The target segment may be associated with a particular behavior, perspective, or opinion. To illustrate, referring to FIG. 2, the target segment is a segment of users who like product D.

The method 600 further includes identifying a first attribute measured by a measurement system (e.g., the measurement system 120 or the measurement system 520), at 604. The first attribute is determined to correlate to users tracked by the measurement system and that belong to the target audience segment. For example, the measurement system 120 may identify the target segment 110 in the segment databases 140 and determine a first list of attributes associated with at least one member of the target segment 110. In the example illustrated in FIG. 2, the first list 202 includes attributes associated with at least one member of the target segment of users who like product D. As a further example, the measurement system 520 may identify the first attributes 534 (e.g., demographics and interests) of users of the segment 532.

The method 600 further includes identifying a second attribute that corresponds to the first attribute, where a messaging action directed to the first attribute and/or the second attribute is available for purchase at a digital network, at 606. For example, the reach extension module 124 may use the mapping databases 126 to map the first list of attributes associated with the target segment 110 to a second list of attributes for which messaging actions are available at the digital networks 150. In the example shown in FIG. 2, attributes of the first list 202 are mapped to the attributes 204 for which messaging actions are available to generate the second list 206. As another example, the first attributes 534 of FIG. 5 (e.g., demographics and interests) may be mapped to attributes for which messaging actions are available at the digital networks 530 to form the message groups 528. The method 600 further includes initiating the messaging action at the digital network directed to the first attribute and/or the second attribute, at 608.

In some embodiments, instead of or in addition to identifying the second attribute (at 606) and initiating the messaging action at the digital network (at 608), the method 600 may include initiating an internal messaging action, at 610. The internal messaging action may be directed to other users tracked by the measurement system that do not belong to the target segment (e.g., have not performed a target behavior) but that may have the first attribute and/or a related attribute, as described with reference to the internal data/system(s) 129 of FIG. 1.

Figure 7:
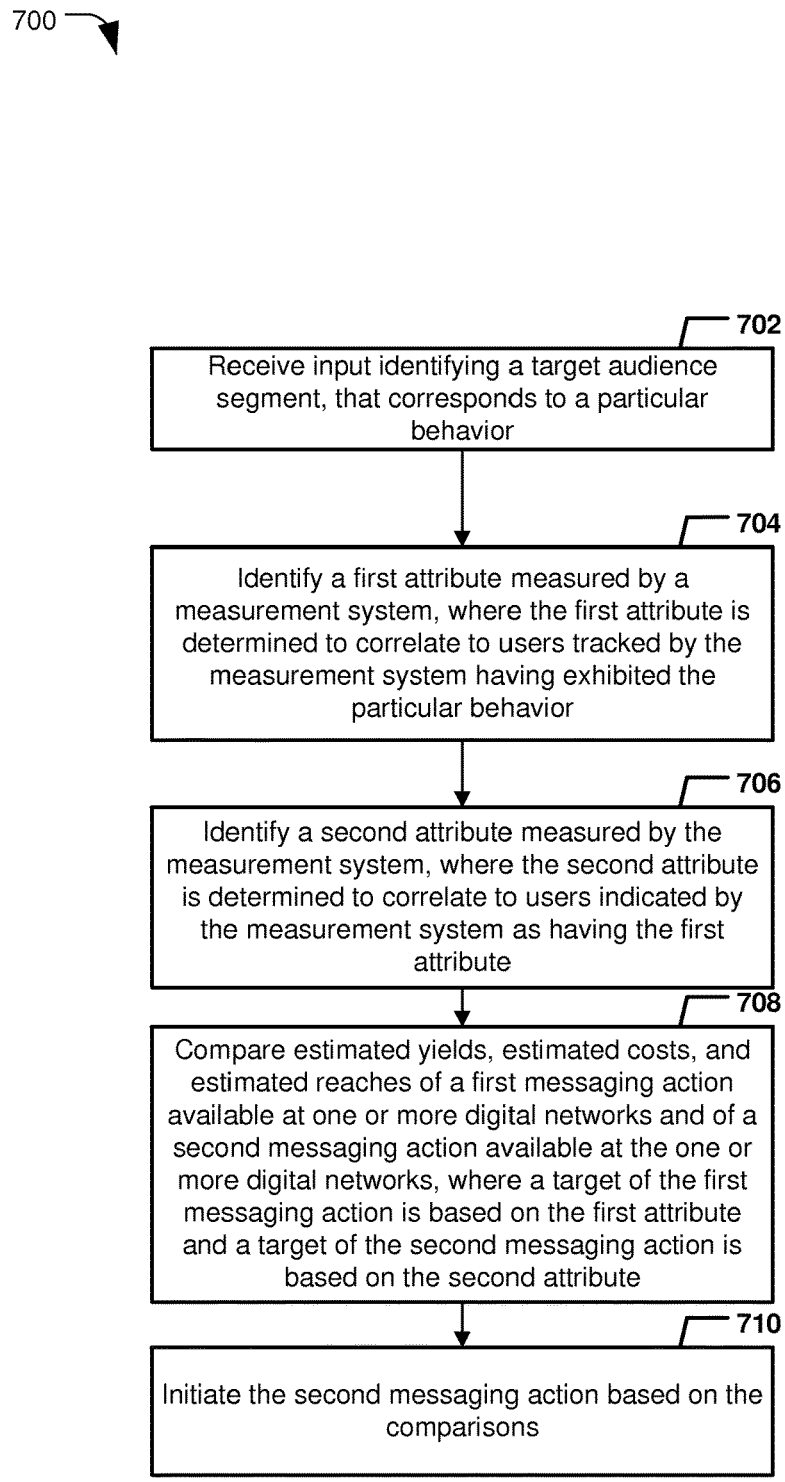
FIG. 7 is a flowchart to illustrate another particular embodiment of a method of initiating targeted messaging actions.

Referring to FIG. 7, another method 700 of initiating targeted messaging actions is shown. In an illustrative embodiment, the method 700 may be performed by a measurement system, such as the measurement system 120, the measurement system 520 of FIG. 5, or a measurement system as further described with reference to FIGS. 8-9.

The method 700 includes receiving input identifying a target audience segment that corresponds to a particular behavior, at 702. For example, the measurement system 120 of FIG. 1 may receive input identifying the target segment 110. As another example, the measurement system 520 may receive input identifying the segment 532 from the client application 510. To illustrate, referring to FIG. 2, the target segment is a segment of users who like product D (e.g., buy or use product D).

The method 700 further includes identifying a first attribute measured by a measurement system, where the first attribute is determined to correlate to users tracked by the measurement system and that belong to the target audience segment, at 704. For example, the measurement system 120 may identify the target segment 110 in the segment databases 140 and determine a first list of attributes associated with at least one member of the target segment 110. In the example illustrated in FIG. 2, the first list 202 includes attributes associated with at least one member of the target segment of users who like product D (e.g., buy or use product D). As a further example, the measurement system 520 may identify the first attributes 534 (e.g., demographics and interests) of users of the segment 532.

The method 700 further includes identifying a second attribute measured by the measurement system, where the second attribute is determined to correlate to users indicated by the measurement system as having the first attribute, at 706. For example, the measurement system 120 may identify attributes related to attributes of the first list. As shown in FIG. 2, the related attribute 203 may be determined to be related to an attribute of the first list 202. The relation may be based on correlation between the related attribute and an attribute on the first list.

The method 700 further includes comparing estimated yields, estimated costs, estimated reaches, or a combination thereof of a first messaging action available for purchase at one or more digital networks and estimated yields, estimated costs, estimated reaches, or a combination thereof of a second messaging action available at the one or more digital networks, at 708. A target of the first messaging action is based on the first attribute and a target of the second messaging action is based on the second attribute. For example, the table 208 of FIG. 2 may be used to compare estimated cost/reach of messaging actions based on the related attribute 203 "Likes TV Show A" (e.g., a second attribute) to estimated cost/reach of messaging actions based on an attribute "Likes Product D" (e.g., a first attribute) from the first list 202. The method 700 further includes initiating the second messaging action at based on the comparisons, at 710.

Figure 8:
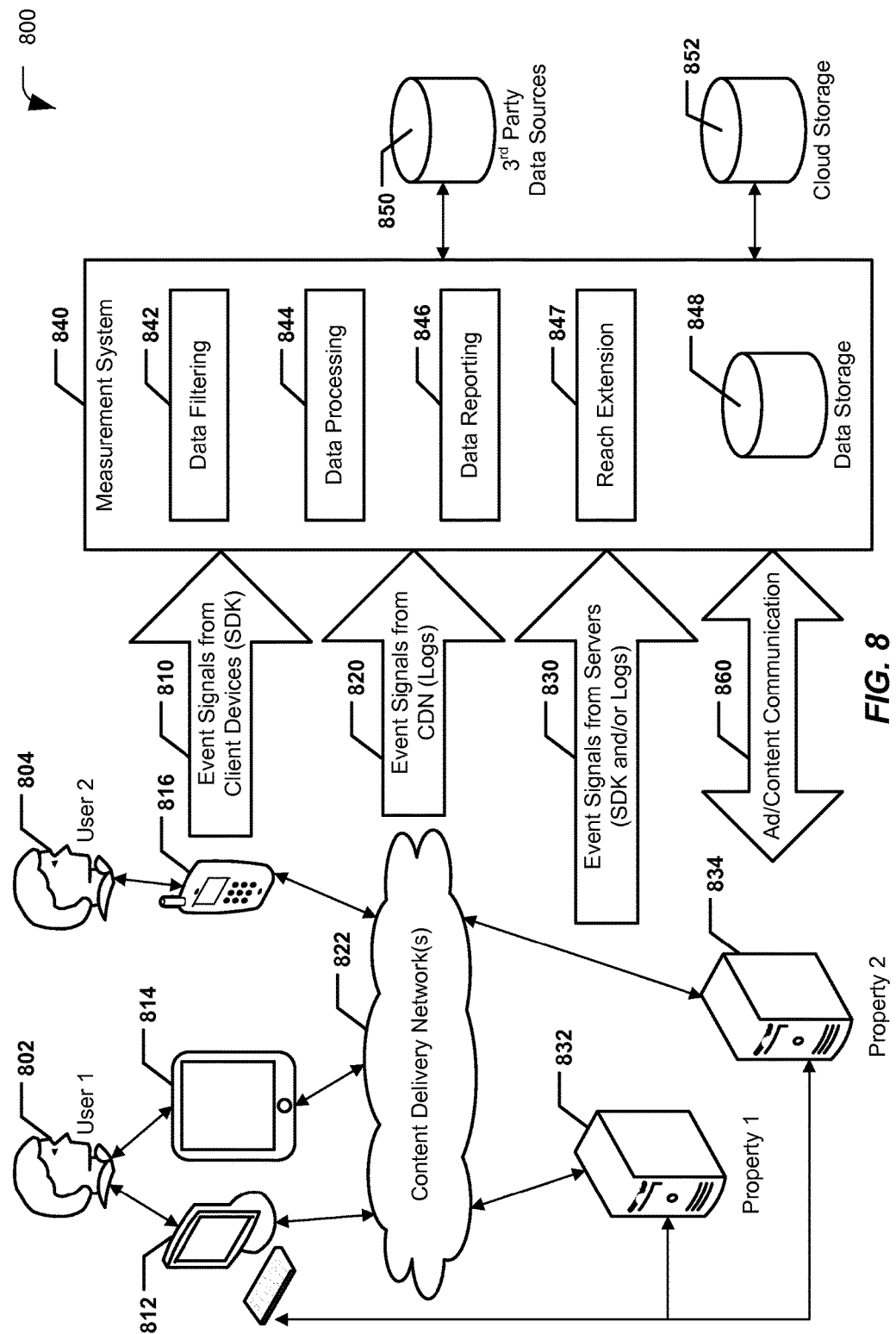
FIG. 8 is a diagram to illustrate a particular embodiment of an audience measurement system.

As described herein, to perform "intelligent" evaluation of targeted messaging actions to improve cost/reach/yield-effectiveness, a measurement system may rely on data that has been collected about audiences of media properties. FIGS. 8-9 illustrate examples such measurement systems.

FIG. 8 illustrates an embodiment of a measurement system 840, and is generally designated 800. For example, the measurement system 840 may include, correspond to, or be included within the measurement system 120 of FIG. 1 or the measurement system 520 of FIG. 5. The measurement system 840 may be communicatively coupled to one or more user devices (e.g., illustrative user devices 812, 814, and 816), to one or more content delivery networks (CDNs) (e.g., illustrative CDN 822), and to media properties (e.g., websites) 832 and 834. In FIG. 8, the media properties 832 and 834 are illustrated by corresponding servers (e.g., web servers). The measurement system 840 may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks and/or wide area networks (e.g., the Internet).

The user devices 812-816 may be associated with various users. For example, the desktop computing device 812 and the tablet computing device 814 may be associated with a first user 802, and the mobile telephone device (e.g., smartphone) 816 may be associated with a second user 804. It should be noted that the user devices 812-816 are shown for example only and are not to be considered limiting. In alternate embodiments, fewer, additional, and/or different types of user devices may be present in the system 800. For example, a radio-frequency identification (RFID)-enabled device may be carried by a user and may transmit a signal in response to detecting that the user is visiting a particular physical location. In a particular embodiment, the user devices 812-816 may execute applications that are operable to access the media properties 832 and 834. For example, the user devices 812-816 may include applications developed using a mobile software development kit (SDK) that includes support for audience measurement functions. To illustrate, when the SDK-based applications interact with the media properties 832 and 834, the applications may generate first event signals 810 that are transmitted by the user devices 812-816 to the measurement system 840.

The first event signals 810 may include information identifying specific interactions by the users 802-804 via the user devices 812-816 (e.g., what action was taken at a media property, when the action was taken, for how long the action was taken, etc.). The user interactions may include interactions with advertisements presented by the media property and/or interactions with content presented by the media property. The event signals 810 may also include an identifier, such as a browser identifier (browser ID) generated by the SDK. In a particular embodiment, browser identifiers are unique across software installations and devices. For example, a first installation of a SDK-based application at the desktop computing device 812 and a second installation of the same SDK-based application at the tablet computing device 814 may use different browser IDs, even though both installations are associated with the same user 802.

In another particular embodiment, Browser IDs may remain consistent until applications or web browsers are "reset" (e.g., caches/cookies are cleared). In some embodiments, the user devices 812-816 may execute applications other than browser applications, such as downloadable mobile applications, that generate the event signals 810 based on user interactions with advertisements and/or content presented by the applications.

The user devices 812-816 may access content provided by the media properties 832 and 834 directly or via the CDN 822. The CDN 822 may provide distributed, load-balanced access to audio, video, graphics, and web pages associated with the media properties 832 and 834. For example, the CDN 822 may include geographically distributed web servers and media servers that serve Internet content in a load-balanced fashion. The CDN 822 may send second event signals 820 to the measurement system 840. The second event signals 820 may include information identifying interactions with media properties and browser IDs provided to the CDN 822 by the user devices 812-816 and/or the media properties 832 and 834. For example, the second event signals 820 may include CDN logs or data from CDN logs.

The media properties 832 and 834 may be controlled by the same entity (e.g., may be part of a federated property) or by different entities. The media properties 832 and 834 may send third event signals 830 to the measurement system 840. The third event signals 830 may include information identifying interactions with the media properties and browser IDs provided by the user devices 812-816 during communication with the media properties 832 and 834 (e.g., communication via hypertext transfer protocol (HTTP), transport control protocol/internet protocol (TCP/IP), or other network protocols).

In a particular embodiment, the third event signals 830 may include server logs or data from server logs. Alternately, or in addition, the third event signals 830 may be generated by SDK-based (e.g., web SDK-based) applications executing at the media properties 832 and 834, such as scripts embedded into web pages hosted by the media properties 832 and 834.

In a particular embodiment, the media properties 832 and 834 may send data to the measurement system 840 and receive data from the measurement system 840 regarding advertisements and/or content presented by the media properties 832 and 834. Such communication is illustrated in FIG. 8 as advertisement/content communication 860. For example, an advertisement (or software associated with the advertisement that is executing on a client device, such as web server, a computer, a mobile phone, a tablet device, etc.) may collect and transmit data on a per-advertisement, per-user basis. The data may include or identify a profile of a user, a duration that the user viewed the advertisement, action(s) performed by the user with respect to the advertisement, etc. As another example, a content item or software associated therewith may collect and transmit data regarding user interactions with the content item.

In a particular embodiment, the measurement system 840 includes a data filtering module 842, a data processing module 844, a data reporting module 846, and a reach extension module 847 (e.g., the reach extension module 124 of FIG. 1 or the reach extension module 524 of FIG. 5). In a particular embodiment, each of the modules 842-847 is implemented using instructions executable by one or more processors at the measurement system 840.

The data filtering module 842 may receive the event signals 810, 820, and 830. The data filtering module 842 may check the event signals 810, 820, and 830 for errors and may perform data cleanup operations when errors are found. The data filtering module 842 may also receive and perform cleanup operations on advertisement measurement data and content measurement data received from the media properties 832 and 834 and from applications executing on the user devices 812-816. In a particular embodiment, the data filtering module 842 may implement various application programming interfaces (APIs) for event signal collection and inspection. The data filtering module 842 may store authenticated/verified event signals in a database, event cache or archive, such as in data storage 848 and/or cloud storage 852. In a particular embodiment, the measurement system 840 includes or has access to a brand database that tracks brands. For example, "raw" data corresponding to the brand database and other collected data may be stored in the cloud storage 852. Signals received from the media properties 832 and 834 and from applications executing the user devices 812-816 may identify a brand that matches one of the brands in the brand database. The measurement system 840 may thus track advertisements/content for various brands across multiple media properties.

The data processing module 844 may associate received event signals (and interactions represented thereby) with user profiles of users. For example, when an event signal having a particular browser ID is a social networking registration event (e.g., when a user logs into a website using a Facebook® account, a Twitter® account, a LinkedIn® account, or some other social networking account), the data processing module 844 may retrieve a corresponding social networking profile or other user profile data from third party data sources 850. Facebook is a registered trademark of Facebook, Inc. of Menlo Park, Calif. Twitter is a registered trademark of Twitter, Inc. of San Francisco, Calif. LinkedIn is a registered trademark of LinkedIn Corp. of Mountain View, Calif. In a particular embodiment, the social networking profile or other user profile data is received after an authentication process. For example, the measurement system 840 may receive a user token. The user token may enable the measurement system 840 to request a social network for information associated with a corresponding user.

It will be appreciated that interactions that were previously associated only with the particular browser ID (i.e., "impersonal" alphanumeric data) may be associated with an actual person (e.g., John Smith) after retrieval of the social networking profile or user profile. Associating interactions with individuals may enable qualitative analysis of the audiences of media properties. For example, if John Smith is a fan of a particular sports team, the measurement system 840 may indicate that at least one member of the audience of the first media property 832 or the second property 834 is a fan of the particular sports team. When a large percentage of a media property's audience shares a particular characteristic or interest, the media property may use such information in selecting and/or generating advertising or content. User profiles (e.g., a profile of the user John Smith) and audience profiles (e.g., profiles for the media properties associated with the media properties 832 and 834) may be stored in the data storage 848, the cloud storage 852, and/or in another database, as further described with reference to FIG. 9. An audience profile for a particular media property may be generated by aggregating the user profiles of the individual users (e.g., including John Smith) that interacted with the particular media property.

Audience profiles may be generated using as few as one or two user profiles, although any number of user profiles may be aggregated. In a particular embodiment, audience profiles may be updated periodically (e.g., nightly, weekly, monthly, etc.), in response to receiving updated data for one or more users in the audience, in response to receiving a request for audience profile data, or any combination thereof. Audience profiles may similarly be generated for audiences of a particular mobile application based on signals generated by installations of the mobile application on various user devices.

The data reporting module 846 may generate various interfaces, such as the GUI 400 of FIG. 4. The data reporting module 846 may also support an application programming interface (API) that enables external devices to view and analyze data collected and stored by the measurement system 840. In a particular embodiment, the data reporting module 846 is configured to segment the data. In a particular embodiment, the measurement system 840 may be operable to define "new" segments based on performing logical operations (e.g., logical OR operations and logical AND operations).

The data processing module 844 may also be configured to, upon receiving an event signal, parse the event signal to identify what user and media property the event signal corresponds to. The data processing module 844 may store data corresponding to the event signal in one or more databases (e.g., the cloud storage 852, the data storage 848, a user profile database, etc.). If the user is a new audience member for the media property, the data processing module 844 may assign a new ID to the user.

During operation, the users 802-804 may interact with the media properties 832 and 834 and with applications executing on the user devices 812-816. In response to the interactions, the measurement system 840 may receive the event signals 810, 820, 830, and/or 860. Each event signal may include a unique identifier, such as a browser ID and/or an audience member ID. If the user is a "new" audience member, the data processing module 844 may create a user profile. Data for the user profile may be stored in the cloud storage 852 and/or the data storage 848. In a particular embodiment, data for the user profile may be retrieved from the third party data sources 850.

For example, the data processing module 844 may retrieve and store data from one or more social network profiles of the user. The data may include demographic information associated with the user (e.g., a name, an age, a geographic location, a marital/family status, a homeowner status, etc.), social information associated with the user (e.g., social networking activity of the user, social networking friends/likes/interests of the user, etc.), and other types of data. The data processing module 844 may also collect and store data associated with advertisements and content served by the media properties 832 and 834 and by applications executing on the user devices 812-816. In a particular embodiment, the measurement system 840 is further configured to receive offline data from external data sources. For example, the measurement system 840 may receive data regarding transactions (e.g., purchases) made by an audience and may use the transaction data to generate additional signals that contribute to a set of traits of an audience, brand, property, etc. Another example of offline data may be a "data dump" of data collected by an RFID-enabled device or an RFID detector. Offline data may be stored in one or more computer-readable files that are provided to the measurement system 840. In a particular embodiment, offline data can include previously collected data regarding users or audience members (e.g., names, addresses, etc.).

The data reporting module 846 may report data collected by the measurement system 840. For example, the data reporting module 846 may generate reports based on an audience profile of a media property (or application), where the audience profile is based on aggregating user profiles of users that interacted with the media property (or application). To illustrate, the data reporting module 846 may generate an interface indicating demographic attributes of the audience as a whole (e.g., a percentage of audience members that are male or female, percentages of audience members in various age brackets, percentages of audience members in various income bracket, most common audience member cities/states of residence, etc.). The interface may also indicate social attributes of the audience as a whole (e.g., the most popular movies, sports teams, etc. amongst members of the audience). Audience profiles may also be segmented and/or aggregated with other audience profiles. Audience profiles may further be segmented based on advertisement, advertisement campaign, brand, content item, etc. Audience profiles may also be constructed by combining segments.

In a particular embodiment, the system 800 may also receive event signals based on measurements (e.g., hardware measurements) made at a device. For example, an event signal from the tablet computing device 814 or the mobile telephone device 816 may include data associated with a hardware measurement at the tablet computing device 814 or the mobile telephone device 816, such as an accelerometer or gyroscope measurement indicating an orientation, a tilt, a movement direction, and/or a movement velocity of the tablet computing device 814 or the mobile telephone device 816. As another example, the system 800 may receive a signal in response to an RFID device detecting that a user is visiting a particular physical location. The system 800 of FIG. 8 may also link interactions with user profiles of users. This may provide information of "how many" viewers and "how long" the viewers watched a particular video (e.g., as in direct response measurement systems), and also "who" watched the particular video (e.g., demographic, social, and behavioral attributes of the viewers).

Figure 9A:
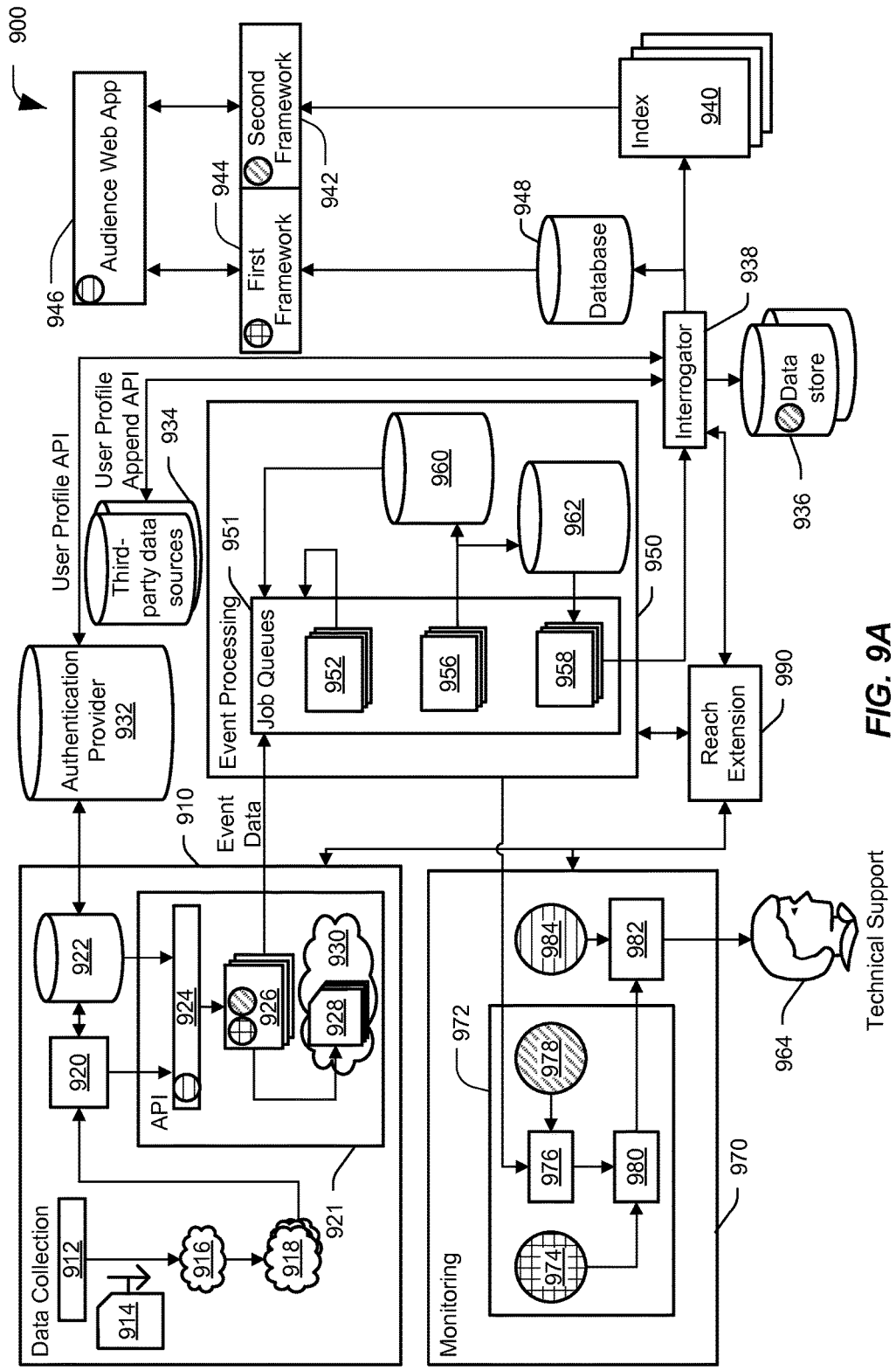
FIGS. 9A, 9B, 9C, and 9D are diagrams to illustrate another particular embodiment of an audience measurement system.
Figure 9B:
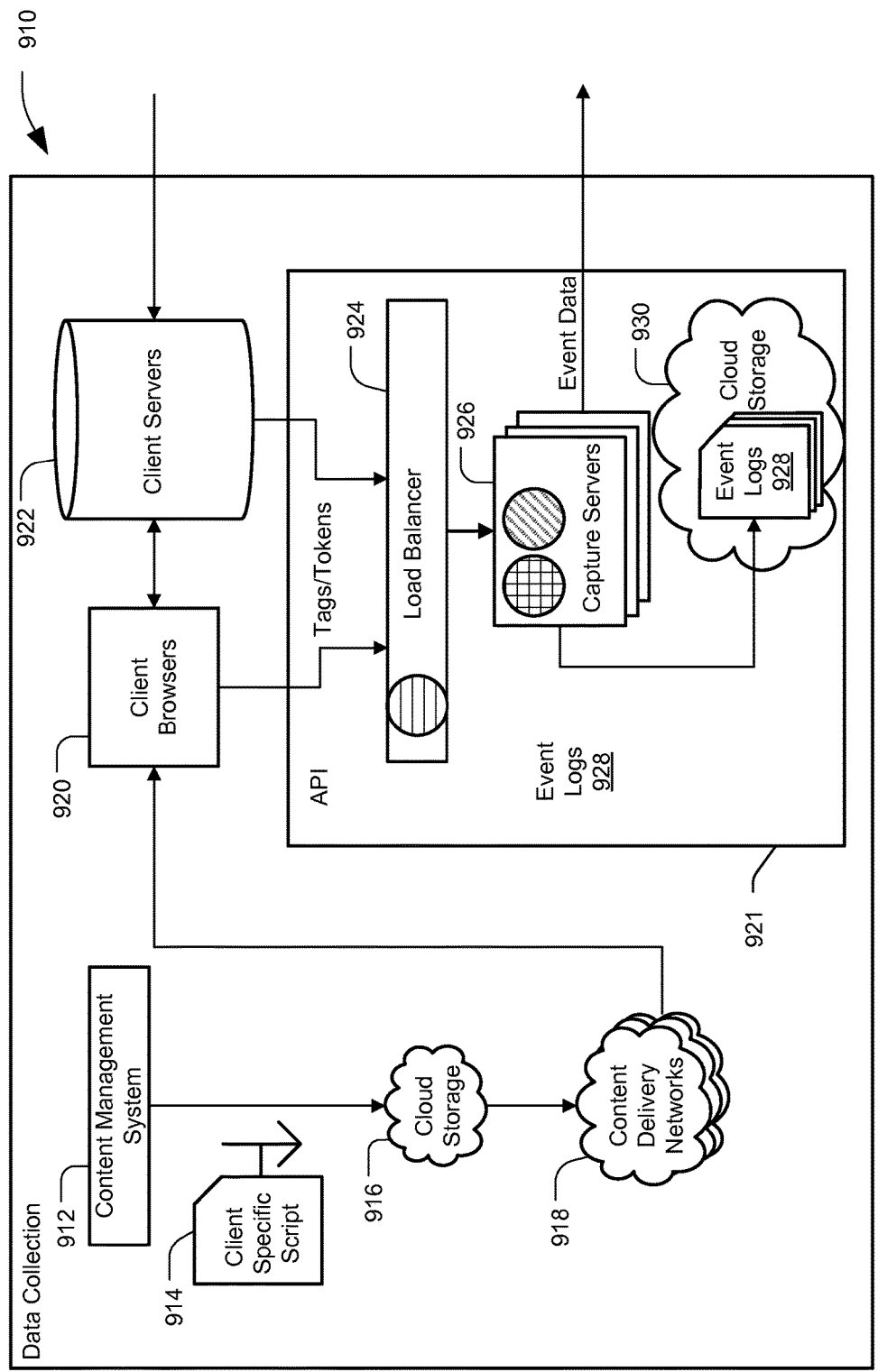
Figure 9C:
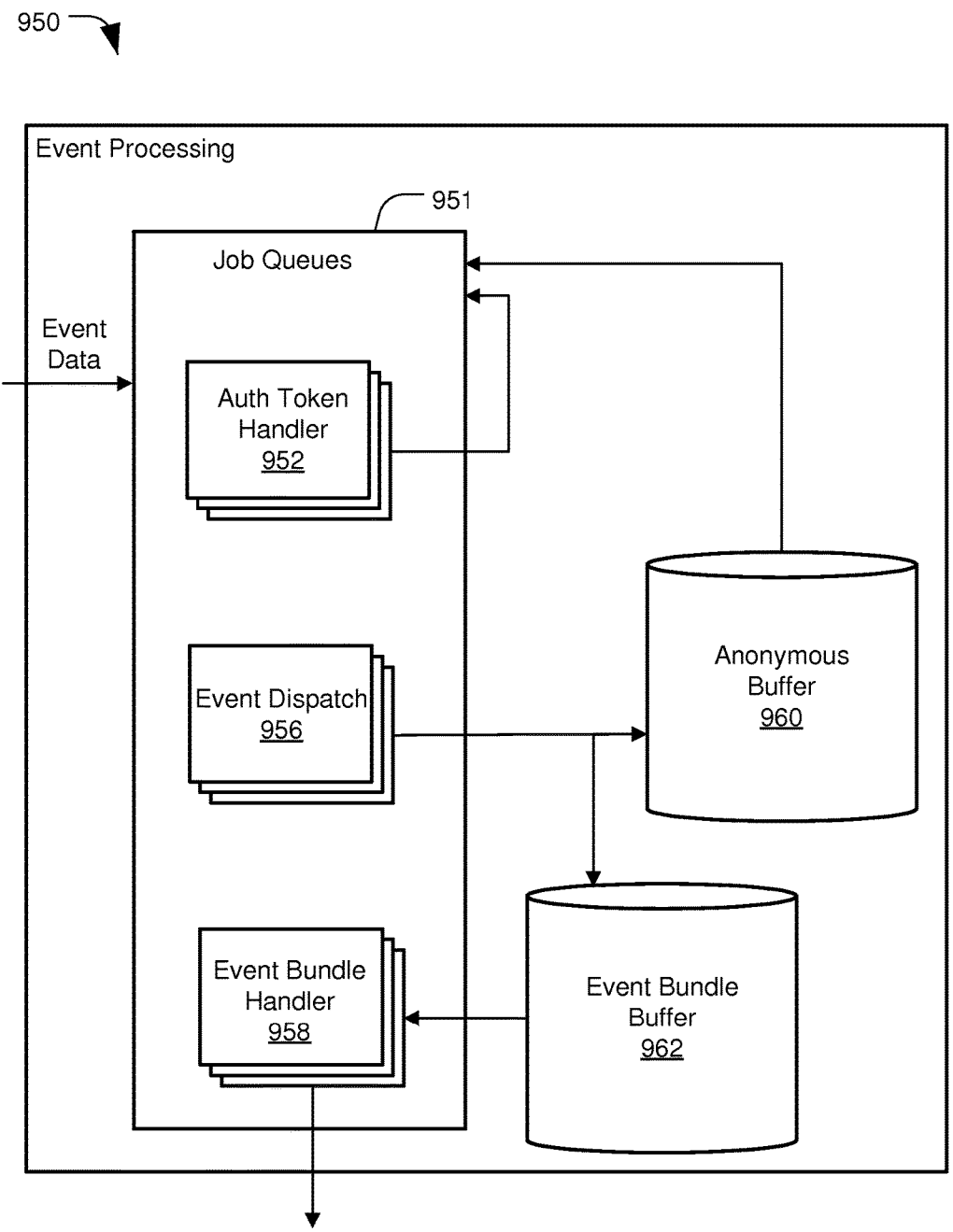
Figure 9D:
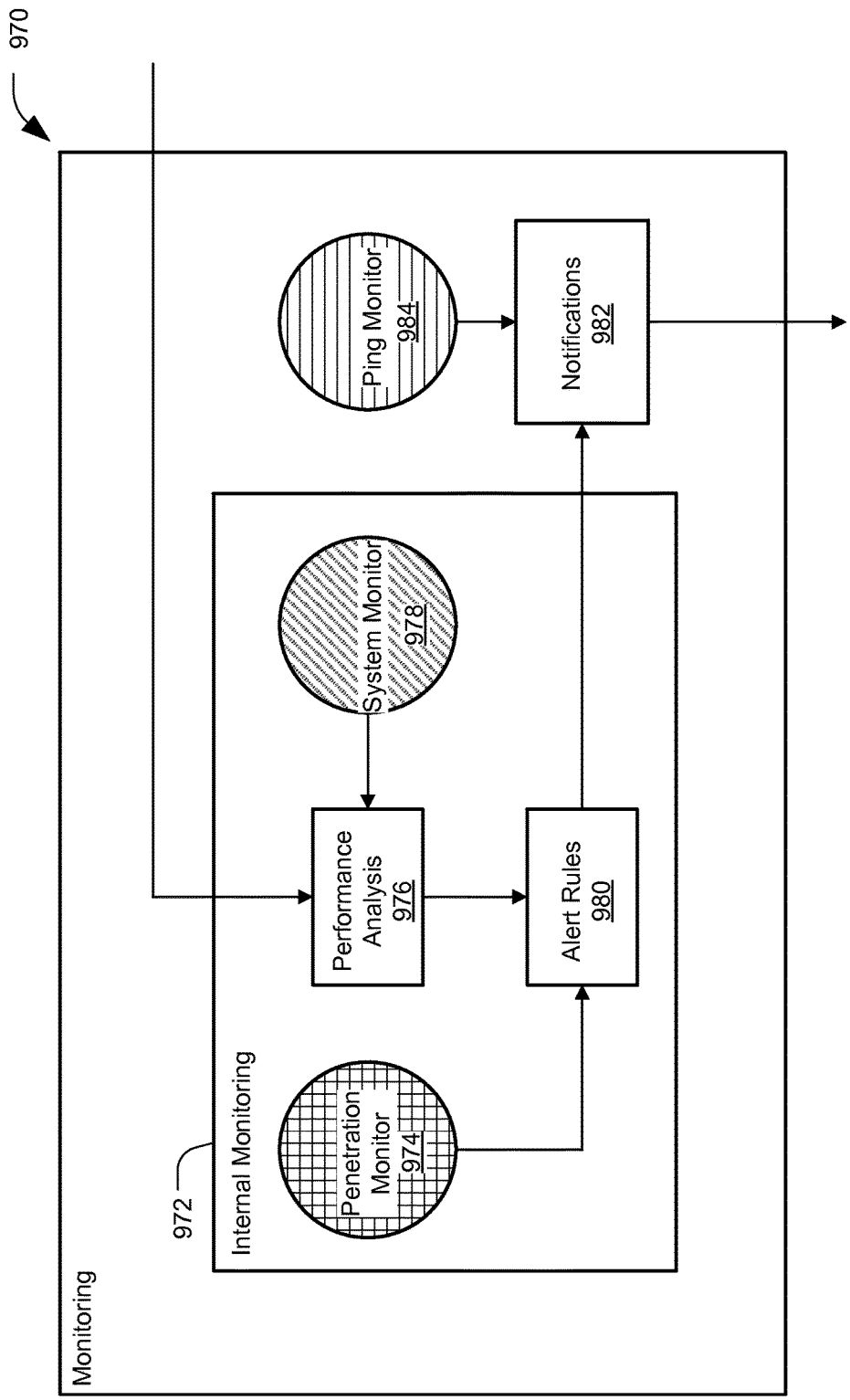

FIG. 9A illustrates a particular embodiment of a system 900 in accordance with the present disclosure. The system 900 includes a data collection tier (e.g., subsystem) 910, an event processing tier 950, a monitoring tier 970, and a reach extension module 990 (e.g., the reach extension module 124 of FIG. 1, the reach extension module 524 of FIG. 5, or the reach extension module 847 of FIG. 8). Components of the data collection tier 910 are illustrated in further detail in FIG. 9B. Components of the event processing tier 950 are illustrated in further detail in FIG. 9C. Components of the monitoring tier are illustrated in further detail in FIG. 9D. As further described with reference to FIG. 9D, the monitoring tier includes a penetration monitor 974 that is illustrated using horizontal and vertical hatching, a system monitor 978 that is shown using diagonal hatching, and a ping monitor 984 that is shown using horizontal-only hatching. Various other components in FIG. 9 include indicators with hatching corresponding to their respective monitor(s). For example, capture servers 926 include indicators to illustrate that the capture servers are monitored by both the penetration monitor 974 and the system monitor 978.

The system 900 includes (or has access to) an authentication provider 932, third party data sources 934, an audience web application 946, a first framework 944, a second framework 942, a database 948, an interrogator 938, a data store 936, and an index 940. In an illustrative embodiment, the third party data sources 934 are the third party data sources 850 of FIG. 8, and the event processing tier 950 and the interrogator 938 correspond to the data processing module 844 of FIG. 8. In a particular embodiment, information from the third party data sources 934 is mapped to information collected by the system 900 by using personally identifiable information as a key to the third party data sources 934. For example, personally identifiable information may include an e-mail address, first/last name, a mailing or residential address, etc. To illustrate, when the system 900 has an e-mail address for a user, the system 900 may request the third party data sources 934 for additional information associated with the e-mail address.

The data collection tier 910 includes a content management system (CMS) 912, cloud storage 916, content delivery networks 918, client browsers 920, and client servers 922. The data collection tier 910 may further include an application programming interface (API) 921. The API 921 includes a load balancer 924, the capture servers 926, and cloud storage 930.

The event processing tier 950 includes a job queues module 951, an anonymous buffer 960, and an event bundle buffer 962. The job queues module 951 includes an authentication token handler 952, an event dispatch 956, and an event bundle handler 958. In alternate embodiments, the job queues module 951 may include more, fewer, and/or different handlers than illustrated in FIG. 9.

The monitoring tier 970 includes an internal monitoring module 972, the ping monitor 984, and a notifications module 982. The internal monitoring module 972 includes the penetration monitor 974, a performance analysis module 976, the system monitor 978, and an alert rules module 980.

During operation, the content management system 912 may be used to generate a client specific script (e.g., webscript) 914 for various clients (e.g., media properties). The client specific script 914 may be stored in the cloud storage 916 and replicated to the content delivery networks 918. As audience members register and interact with a media property, the content delivery networks 918 may deliver the client specific script 914, along with property content, to the client browsers 920. Based on the client specific script 914, the client browsers 920 may generate tags (e.g., a tag corresponding to a particular user activity, such as watching a video) or tokens (e.g., a social networking registration token). The tags or tokens may be sent to the load balancer 924. The client servers 922 may also generate tags or tokens to send to the load balancer 924 based on user registrations and user activity at media properties. The tags or tokens from the client servers 922 may be authenticated by the authentication provider 932.

The load balancer 924 may send the tags or tokens to the capture servers 926 based on a load balancing algorithm. The capture servers 926 may generate event data (e.g., event signals) based on the tags or tokens. The capture servers 926 may store the event data in event logs 928 in the cloud storage 930 and send the event data to the job queues module 951.

The job queues module 951 may distribute the event data to different event handler(s) based on the type of the event data. For example, event data including an authentication token may be sent to the authentication token handler 952. In addition, event data requiring additional information from social media sources may be sent to the authentication token handler 952. The handler 952 may perform asynchronous event collection operations based on the received event data. For example, when a new user registers with a media property using a social networking profile, a token may be provided by the data collection tier to the authentication token handler 952. The handler 952 may use the token to retrieve demographic and brand affinity data for the user from the user's social networking profile.

Event signals may also be sent to the event dispatch 956, which determines whether the event signals correspond to known or unknown users. When event data corresponds to an unknown user, the event dispatch 956 buffers the event data in the anonymous buffer 960. After a period of time (e.g., three days), event data from the anonymous buffer 960 may be sent to the job queues module 951 to be processed again.

When event data corresponds to a "known" user (e.g., a user that has already been assigned a user ID), the event dispatch 956 may send the event data to the event bundles buffer 962. The event bundle handler 958 may retrieve event data stored in the event bundles buffer 962 every bundling period (e.g., one hour). The event bundles processor 958 may bundle event data received each bundling period into an event bundle that is sent to the interrogator 938.

The interrogator 938 may parse the event bundle and update the data store 936, the database 948 (e.g., a relational database), and/or the index 940. In a particular embodiment, the database 948 corresponds to a profiles database that is accessible the first framework 944 to the audience web application 946. For example, the first framework 944 may be a database-driven framework that is operable to dynamically generate webpages based on data in the database 948. The audience web application may be operable to generate various graphical user interfaces (e.g., the GUI 400 of FIG. 4) to analyze the data collected by the system 900. The index 940 may be accessible to the audience web application 946 via the second framework 942. In one example, the second framework 942 supports representational state transfer (REST)-based data access and webpage navigation. Although not shown, in particular embodiments, the data store 936 may also be accessible to the audience web application 946.

The monitoring tier 970 may monitor the various components of the system 900 during operation to detect errors, bottlenecks, network intrusions, and other issues. For example, the penetration monitor 974 may collect data indicating unauthorized access to or from the capture servers 926 and the first framework 944. The penetration monitor 974 may provide the data to the alert rules module 980. Similarly, the system monitor 978 may collect performance data from the capture servers 926, from the second framework 942, and from the data store 936. The system monitor 978 may provide the performance data to the performance analysis module 976, which may analyze the data and send the analyzed data to the alert rules module 980. The alert rules module 980 may compare received data to alert rules and, based on the comparison, send an alert to the notifications module 982. For example, the alert rules module 980 may determine that an intruder has accessed components of the system 900 or that the system 900 is not operating at a desired level of efficiency, and may send an alert to the notifications module 982.

The notifications module 982 may also receive alerts from the ping monitor 984. The ping monitor 984 may monitor the load balancer 924 and the audience web application 946 and collect data regarding uptime, downtime, and performance, and provide alerts to the notification module 982.

The notification module 982 may send notifications (e.g., via short message service (SMS), e-mail, instant messaging, paging, etc.) to one or more technical support staff members 964 to enable timely response in the event of errors, performance bottlenecks, network intrusion, etc.

In accordance with various embodiments of the present disclosure, the methods, functions, and modules described herein may be implemented by hardware, software programs executable by a computer system, or a combination thereof. Further, in an exemplary embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, a set-top box, a media player, or any combination thereof. The computer system may be connected, e.g., using a network, to other computer systems or peripheral devices. For example, the computer system or components thereof can include or be included within any one or more devices, modules, and/or components illustrated in FIGS. 1-9. In a networked deployment, the computer system may operate in the capacity of a server or as a client user computer in a server-client user network environment, or as a peer computer system in a peer-to-peer (or distributed) network environment. The term "system" can include any collection of systems or subsystems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

In accordance with at last one described embodiment, a method includes receiving an input identifying a target audience segment. The method further includes identifying a first attribute measured by a measurement system, where the first attribute is determined to correlate to users tracked by the measurement system and that belong to the target audience segment. The method further includes identifying a second attribute that corresponds to the first attribute. A messaging action directed to the first attribute, the second attribute, or a combination thereof is available at a digital network. The method further includes initiating the messaging action at the digital network directed to the first attribute, the second attribute, or a combination thereof.

In another particular embodiment, a method includes receiving an input identifying a target audience segment that corresponds to a particular behavior. The method further includes identifying a first attribute measured by a measurement system, where the first attribute is determined to correlate to users tracked by the measurement system that have exhibited the particular behavior and that belong to the target audience segment. The method further includes identifying a second attribute measured by the measurement system, where the second attribute is determined to correlate to users indicated by the measurement system as having the first attribute. The method further includes determining a first metric associated with a first messaging action that is available at one or more digital networks, where the first messaging action is based on the first attribute, and where the first metric includes a first estimated yield, a first estimated cost, a first estimated reach, or a combination thereof. The method includes determining a second metric associated with a second messaging action that is available at the one or more digital networks and that is directed to the second attribute, where a target of the second messaging action is based on the second attribute, and where the second metric includes a second estimated yield, a second estimated cost, a second estimated reach, or a combination thereof. The method also includes initiating the second messaging action based on a comparison of the first metric to the second metric.

In another particular embodiment, a computer readable storage device stores instructions that when executed by a processor cause the processor to perform operations. The operations include identifying, based on received input identifying a target audience behavior, a first attribute measured by a measurement system, where the first attribute is correlated to users identified by the measurement system as having performed the target behavior. The operations further include initiating a messaging action directed to a second attribute at a digital network, where the second attribute corresponds to the first attribute.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   storing, in a memory device of a measurement system comprising at least a processor, correlation data indicating that a first attribute is correlated with a second attribute;
   receiving, at a network interface of the measurement system, a first request to initiate a first messaging action directed to a target audience segment, the target audience segment associated with the first attribute;
   subsequent to receiving the first request and based on the correlation data indicating that the first attribute is correlated to the second attribute, transmitting a second request to a server via the network interface, the second request to initiate a second messaging action instead of the first messaging action, the second messaging action corresponding to a second group of users associated with the server, wherein each user included in a first group of users is associated with the first attribute, wherein at least one user included in the second group is associated with the second attribute but not the first attribute, and wherein at least one user is included in both the first and the second groups;

detecting, by the measurement system, a conversion event associated with a particular user of the second group of users, the conversion event initiated at a conversion web page; and in response to the conversion event, sending retargeting data to a web browser associated with the particular user, wherein the retargeting data enables at least one digital network distinct from the conversion web page to identify the particular user and to send retargeting content to the web browser, the retargeting content associated with the second messaging action.

2. The method of claim 1, wherein the server is associated with a social networking service, and wherein the first messaging action corresponds to sending an electronic mail (e-mail) message, sending a text message, displaying an advertisement on a web page, sending a push notification, sending a social networking message, or any combination thereof, that is targeted to the first group of users.

3. The method of claim 1, wherein the server is associated with a social network, an advertising network, an Internet-based network, a search engine, or any combination thereof, and wherein the first attribute includes a brand affinity, a behavior, an opinion of a member of the target audience segment, a perspective of the member of the target audience segment, or any combination thereof.

4. The method of claim 1, further comprising:
receiving, at the network interface, message criteria from a client application executing at another device; and
generating, at the processor, the second request based on the message criteria, wherein the message criteria includes a threshold number of users associated with the server that are predicted to receive a message in response to a particular messaging action, a threshold cost of the particular messaging action, or a combination thereof.

5. The method of claim 1, further comprising transmitting, via the network interface, a third request to the server, the third request identifying a third messaging action, wherein the third messaging action corresponds to a third group of users associated with a plurality of attributes.

6. The method of claim 1, further comprising:
storing data in a database, wherein the data indicates an actual cost, an actual yield, an actual reach, or a combination thereof, of the second messaging action; and
wherein the second request indicates a third messaging action based on the data.

7. The method of claim 1, wherein a message associated with the first messaging action or the second messaging action is configured to influence one or more individuals to perform an action, form a particular opinion, join a cause, enroll in a program, watch a video, read text, or a combination thereof.

8. The method of claim 1, further comprising:
receiving presence data from a radio-frequency identification (RFID) device, the presence data indicating that an individual has visited a location associated with the RFID device; and in response to the presence data, updating profile data associated with the individual to indicate that the individual is a member of the target audience segment.

9. The method of claim 1, further comprising:
storing, in the memory device, extension data indicating an approximate number of additional users associated with the server that may be reached by utilizing the correlation data indicating that the first attribute is correlated to the second attribute; and
calculating, with the processor and using the extension data, a number of additional users that would be reached by initiating the second messaging action instead of the first messaging action.

10. The method of claim 1, wherein the correlation data father comprises data indicating that a third attribute is correlated to the first attribute, the second attribute, or both, the method further comprising:
subsequent to transmitting the second request to the server, transmitting a third request to the server to initiate a third messaging action, the third messaging action corresponding to a third group of users associated with the server, wherein at least one user included in the third group has the third attribute but neither the first nor the second attributes.

11. The method of claim 10, wherein the correlation data further comprises data indicating that a fourth attribute is correlated to the first attribute, the second attribute, the third attribute, or a combination thereof, the method further comprising:
subsequent to transmitting the third request to the server, transmitting a fourth request to the server to initiate a fourth messaging action, the fourth messaging action corresponding to a fourth group of users associated with the server, wherein at least one user included in the fourth group has the fourth attribute but not the first, second, or third attributes.

12. The method of claim 1, wherein each member of the target audience segment is unassociated with the second attribute, and wherein the first messaging action, the second messaging action, or a combination thereof further identify pricing information.

13. The method of claim 12, wherein the first messaging action, the second messaging action, or a combination thereof identify a price comprising a cost per mille (CPM), a cost per click (CPC), or a cost per action (CPA), and wherein the first messaging action, the second messaging action, or a combination thereof comprise a bid.

14. A method comprising:
storing, in a memory device of a measurement system comprising at least a processor, correlation data indicating that a first attribute is correlated with a second attribute;
receiving, at a network interface of the measurement system, a first request to initiate a first messaging action directed to a target audience segment, the target audience segment associated with the first attribute; and
subsequent to receiving the first request and based on a comparison of a first metric associated with a first messaging action and a second metric associated with a second messaging action, based on the first attribute, and based on the correlation data indicating that the first attribute is correlated to the second attribute, transmitting, via the network interface, a second request to a server, the second request identifying the second messaging action without identifying the first messaging action, wherein the first messaging action corresponds to a first group of users associated with the server and the second messaging action corresponds to a second group of users associated with the server, wherein at least one user included in the first group is associated with the first attribute, wherein at least one user included in the second group is associated with the second attribute but not the first attribute, and wherein at least one user is included in both the first and the second groups;

detecting, by the measurement system, a conversion event associated with a particular user of the second group of users, the conversion event initiated at a conversion web page; and in response to the conversion event, sending retargeting data to a web browser associated with the particular user, wherein the retargeting data enables at least one digital network distinct from the conversion web page to identify the particular user and to send retargeting content to the web browser, the retargeting content associated with the second messaging action.

15. The method of claim 14, wherein the first metric comprises a first estimated yield, a first estimated cost, a first estimated reach, or a combination thereof, and wherein the second metric comprises a second estimated yield, a second estimated cost, a second estimated reach, or a combination thereof.

16. The method of claim 14, further comprising:
after transmitting the second request, receiving result data associated with the second messaging action; and
based on the result data, adjusting a rate at which the second messaging action is purchased.

17. A computer readable storage device storing instructions that, when executed by a processor, cause the processor to perform operations comprising:
storing, in a memory device of a measurement system comprising at least a processor, correlation data indicating that a first attribute is correlated to a second attribute;

receiving, at a network interface of the measurement system, a first request to initiate a first messaging action directed to a target audience segment, the target audience segment associated with a first attribute; and subsequent to receiving the first request and based on the correlation data indicating that the first attribute is correlated to the second attribute, transmitting a second request to a server via the network interface, the second request to initiate a second messaging action instead of the first messaging action, the second messaging action corresponding to a second group of users associated with the server, wherein each user included in a first group has the first attribute, wherein at least one user included in the second group is associated with the second attribute but not the first attribute, and wherein at least one user is included in both the first and the second groups;

detecting, by the measurement system, a conversion event associated with a particular user of the second group of users, the conversion event initiated at a conversion web page; and in response to the conversion event, sending retargeting data to a web browser associated with the particular user, wherein the retargeting data enables at least one digital network distinct from the conversion web page to identify the particular user and to send retargeting content to the web browser, the retargeting content associated with the second messaging action.

18. The computer readable storage device of claim 17, wherein the second request identifies at least one of a number of conversions, a cost per acquisition, a reach, revenue associated with the conversions, an amount of campaign budget spent or remaining, or demographic information about an advertising audience.

* * * * *